US008870642B2

(12) United States Patent
Leupp et al.

(10) Patent No.: US 8,870,642 B2
(45) Date of Patent: Oct. 28, 2014

(54) GAMING SYSTEM AND METHOD PROVIDING A MULTIPLAY SLOT GAME INCLUDING A CASCADING SYMBOLS FEATURE IN WHICH SYMBOLS ARE REMOVED FROM CORRESPONDING SYMBOL DISPLAY AREAS OF DIFFERENT SETS OF SYMBOL DISPLAY AREAS

(71) Applicant: IGT, Reno, NV (US)

(72) Inventors: Jon M. Leupp, Orinda, CA (US); Mark C. Nicely, Daly City, CA (US); Leandro Basallo, San Francisco, CA (US); Timothy L. Isaacson, Hayward, CA (US); Scott A. Caputo, Santa Clara, CA (US)

(73) Assignee: IGT, Las Vegas, NV (US)

( * ) Notice: Subject to any disclaimer, the term of this patent is extended or adjusted under 35 U.S.C. 154(b) by 5 days.

(21) Appl. No.: 13/827,336

(22) Filed: Mar. 14, 2013

(65) Prior Publication Data

US 2014/0274284 A1 Sep. 18, 2014

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***G07F 17/34*** | (2006.01) |

(52) U.S. Cl.

CPC .................................... *G07F 17/34* (2013.01)
USPC ............................................. 463/20; 463/16

(58) Field of Classification Search

USPC .................................................... 463/16, 20
See application file for complete search history.

(56) References Cited

U.S. PATENT DOCUMENTS 4,099,722 A 7/1978 Rodesch et al.
4,114,890 A 9/1978 Yamamoto et al.

(Continued)

FOREIGN PATENT DOCUMENTS

GB 2 098 778 11/1981
GB 2 161 008 1/1986

(Continued)

OTHER PUBLICATIONS

"Capistrano Mu1tiPLAY Video Slots," Brochure, IGT Copyright 2011, available at http://media.igt.com/marketing/Promotional-Literature/GamePromoLit_1AE7C-16BDD.pdf (2 pages).

(Continued)

*Primary Examiner* — Kevin Y Kim
(74) *Attorney, Agent, or Firm* — Neal, Gerber & Eisenberg LLP

(57) ABSTRACT

Various embodiments of the present disclosure are directed to a gaming system and method providing a game including a cascading symbols feature in which symbols are removed from corresponding symbol display areas of different sets of symbol display areas. In one embodiment, the gaming system displays a first set and a second set of symbol display areas. For each symbol display area, the gaming system displays one of a plurality of different symbols at that symbol display area. If a designated symbol combination is formed by the symbols displayed at the symbol display areas of the first set, the gaming system removes the symbols displayed at the symbol display areas of the second set that correspond to the symbol display area of the first set displaying the symbols forming the designated symbol combination.

36 Claims, 14 Drawing Sheets

(56) References Cited

U.S. PATENT DOCUMENTS 4,198,052 A 4/1980 Gauselmann
4,448,419 A 5/1984 Telnaes
4,573,681 A 3/1986 Okada
4,826,169 A 5/1989 Bessho et al.
4,838,552 A 6/1989 Hagiwara
4,874,173 A 10/1989 Kishishita
4,926,327 A 5/1990 Sidley
5,152,529 A 10/1992 Okada
5,178,390 A 1/1993 Okada
5,205,555 A 4/1993 Hamano
5,209,476 A 5/1993 Eiba et al.
5,259,613 A 11/1993 Marnell
5,277,424 A 1/1994 Wilms
5,324,035 A 6/1994 Morris et al.
5,342,047 A 8/1994 Heidel
5,364,100 A 11/1994 Ludlow et al.
5,370,399 A 12/1994 Liverance
5,371,345 A 12/1994 LeStrange et al.
5,390,934 A 2/1995 Grassa et al.
5,393,061 A 2/1995 Manship et al.
5,423,539 A 6/1995 Nagao
5,449,173 A 9/1995 Thomas et al.
5,470,079 A 11/1995 LeStrange et al.
5,570,885 A 11/1996 Ornstein
5,580,053 A 12/1996 Crouch
5,580,309 A 12/1996 Piechowiak et al.
5,584,764 A 12/1996 Inoue
5,609,524 A 3/1997 Inoue et al.
5,611,535 A 3/1997 Tiberio
5,624,119 A 4/1997 Leake
5,639,088 A 6/1997 Schneider et al.
5,655,961 A 8/1997 Acres et al.
5,674,128 A 10/1997 Holch et al.
5,697,843 A 12/1997 Manship et al.
5,704,835 A 1/1998 Dietz
5,720,662 A 2/1998 Holmes et al.
5,722,891 A 3/1998 Inoue
5,752,881 A 5/1998 Inoue
5,766,074 A 6/1998 Cannon et al.
5,769,716 A 6/1998 Saffari et al.
5,775,692 A 7/1998 Watts et al.
5,833,537 A 11/1998 Barrie
5,890,962 A 4/1999 Takemoto et al.
5,934,672 A 8/1999 Sines et al.
5,967,896 A 10/1999 Jorasch et al.
5,980,384 A 11/1999 Barrie
5,984,782 A 11/1999 Inoue
5,997,401 A 12/1999 Crawford
6,012,982 A 1/2000 Piechowiak et al.
6,024,642 A 2/2000 Stupak
6,033,307 A 3/2000 Vancura et al.
6,056,642 A 5/2000 Bennett
6,059,289 A 5/2000 Vancura et al.
6,059,658 A 5/2000 Mangano et al.
6,068,552 A 5/2000 Walker et al.
6,077,162 A 6/2000 Weiss
6,086,066 A 7/2000 Takeuchi et al.
6,089,976 A 7/2000 Schneider et al.
6,093,102 A 7/2000 Bennett et al.
6,095,921 A 8/2000 Walker et al.
6,117,013 A 9/2000 Eiba et al.
6,120,031 A 9/2000 Adams et al.
6,120,377 A 9/2000 McGinnis et al.
6,142,875 A 11/2000 Kodachi et al.
6,159,095 A 12/2000 Frohm et al.
6,159,096 A 12/2000 Yoseloff
6,186,894 B1 2/2001 Mayeroff
6,190,254 B1 2/2001 Bennett
6,190,255 B1 2/2001 Thomas et al.
6,203,009 B1 3/2001 Sines et al.
6,210,279 B1 4/2001 Dickinson
6,227,971 B1 5/2001 Weiss
6,241,607 B1 6/2001 Payne et al.
6,251,013 B1 6/2001 Bennett
6,261,178 B1 7/2001 Bennett
6,264,561 B1 7/2001 Saffari et al.
6,270,411 B1 8/2001 Gura et al.
6,270,412 B1 8/2001 Crawford et al.
6,290,600 B1 9/2001 Glasson
6,299,165 B1 10/2001 Nagano
6,311,976 B1 11/2001 Yoseloff et al.
6,315,660 B1 11/2001 DeMar et al.
6,315,663 B1 11/2001 Sakamoto
6,315,666 B1 11/2001 Mastera et al.
6,319,124 B1 11/2001 Baerlocher et al.
6,322,078 B1 11/2001 Adams
6,347,996 B1 2/2002 Gilmore et al.
6,361,441 B1 3/2002 Walker et al.
6,364,766 B1 4/2002 Anderson et al.
6,375,570 B1 4/2002 Poole
6,379,248 B1 4/2002 Jorasch et al.
6,394,902 B1 5/2002 Glavich et al.
6,413,161 B1 7/2002 Baerlocher et al.
6,413,162 B1 7/2002 Baerlocher et al.
6,416,408 B2 7/2002 Tracy et al.
6,419,579 B1 7/2002 Bennett
6,428,412 B1 8/2002 Anderson et al.
6,439,995 B1 8/2002 Hughs-Baird et al.
6,454,266 B1 9/2002 Breeding et al.
6,461,241 B1 10/2002 Webb et al.
6,464,581 B1 10/2002 Yoseloff et al.
6,494,454 B2 12/2002 Adams
6,506,114 B1 1/2003 Estes et al.
6,514,141 B1 2/2003 Kaminkow et al.
6,517,432 B1 2/2003 Jaffe
6,517,433 B2 2/2003 Loose et al.
6,551,187 B1 4/2003 Jaffe
6,554,709 B1 4/2003 Brenner et al.
6,558,254 B2 5/2003 Baelocher et al.
6,561,900 B1 5/2003 Baerlocher et al.
6,561,904 B2 5/2003 Locke et al.
6,565,433 B1 5/2003 Baerlocher et al.
6,575,830 B2 6/2003 Baerlocher et al.
6,602,137 B2 8/2003 Kaminkow et al.
6,604,740 B1 8/2003 Singer et al.
6,607,441 B1 8/2003 Acres
6,616,142 B2 9/2003 Adams
6,632,139 B1 10/2003 Baerlocher
6,632,140 B2 10/2003 Berman et al.
6,634,945 B2 10/2003 Glavich et al.
6,641,477 B1 11/2003 Dietz, II
6,644,663 B2 11/2003 Seelig et al.
6,652,378 B2 11/2003 Cannon et al.
6,656,040 B1 12/2003 Brosnan et al.
6,659,864 B2 12/2003 McGahn et al.
6,672,960 B1 1/2004 B-Jensen
6,676,511 B2 1/2004 Payne et al.
6,676,512 B2 1/2004 Fong et al.
6,695,696 B1 2/2004 Kaminkow
6,702,675 B2 3/2004 Poole et al.
6,712,693 B1 3/2004 Hettinger
6,719,630 B1 4/2004 Seelig et al.
6,726,204 B2 4/2004 Inoue
6,731,313 B1 5/2004 Kaminkow
6,733,386 B2 5/2004 Cuddy et al.
6,758,747 B2 7/2004 Baerlocher
6,780,109 B2 8/2004 Kaminkow
6,786,820 B2 9/2004 Gerrard et al.
6,802,775 B2 10/2004 Baerlocher et al.
6,805,349 B2 10/2004 Baerlocher et al.
6,808,454 B2 10/2004 Gerrard et al.
6,817,944 B2 11/2004 Kaminkow et al.
6,832,957 B2 12/2004 Falconer
6,835,133 B2 12/2004 Baerlocher et al.
6,835,134 B2 12/2004 Poole et al.
6,837,788 B2 1/2005 Cannon
6,855,054 B2 2/2005 White et al.
6,860,810 B2 3/2005 Cannon
6,866,583 B2 3/2005 Glavich et al.
6,875,106 B2 4/2005 Weiss et al.
6,880,826 B2 4/2005 Inoue
6,896,615 B2 5/2005 Berman
6,896,617 B2 5/2005 Daly
6,905,405 B2 6/2005 McClintic

(56) References Cited

U.S. PATENT DOCUMENTS 6,905,406 B2 6/2005 Kaminkow et al.
6,908,383 B2 6/2005 Baerlocher et al.
6,910,962 B2 6/2005 Marks et al.
6,913,533 B2 7/2005 Cuddy et al.
6,918,832 B2 7/2005 Baerlocher et al.
6,921,335 B2 7/2005 Rodgers et al.
6,923,441 B2 8/2005 Inoue
6,929,952 B2 8/2005 Baerlocher
6,932,700 B2 8/2005 Bennett et al.
6,939,223 B1 9/2005 Jones
6,942,572 B2 9/2005 Inoue
6,958,013 B2 10/2005 Miereau et al.
6,971,955 B2 12/2005 Baerlocher et al.
6,979,263 B2 12/2005 Baerlocher et al.
6,981,635 B1 1/2006 Hughs-Baird et al.
6,986,710 B2 1/2006 Baerlocher et al.
6,988,947 B2 1/2006 Baerlocher et al.
6,997,804 B2 2/2006 Berman
6,997,808 B2 2/2006 Rodgers et al.
7,001,274 B2 2/2006 Baerlocher et al.
7,014,559 B1 3/2006 Fong
7,014,560 B2 3/2006 Glavich et al.
7,018,293 B2 3/2006 Brown et al.
7,040,985 B2 5/2006 Vancura
7,048,275 B2 5/2006 Adams
7,052,395 B2 5/2006 Glavich et al.
7,056,213 B2 6/2006 Ching et al.
7,070,502 B1 7/2006 Bussick et al.
7,074,127 B2 7/2006 Cuddy et al.
7,077,745 B2 7/2006 Gomez et al.
7,090,580 B2 8/2006 Rodgers et al.
7,094,148 B2 8/2006 Baerlocher et al.
7,104,886 B2 9/2006 Baerlocher et al.
7,104,888 B2 9/2006 Miereau et al.
7,108,602 B2 9/2006 Daly
7,137,888 B2 11/2006 Glavich et al.
7,144,322 B2 12/2006 Gomez et al.
7,153,205 B2 12/2006 Baerlocher
7,156,735 B2 1/2007 Brosnan et al.
7,160,186 B2 1/2007 Cuddy et al.
7,160,187 B2 1/2007 Loose et al.
7,168,704 B1 1/2007 Lawless
7,169,042 B2 1/2007 Muir et al.
7,192,345 B2 3/2007 Muir et al.
7,195,559 B2 3/2007 Gilmore et al.
7,204,753 B2 4/2007 Ozaki et al.
7,226,359 B2 6/2007 Bussick et al.
7,252,591 B2 8/2007 Van Asdale
7,252,592 B2 8/2007 Rodgers et al.
7,275,988 B2 10/2007 Aida et al.
7,294,058 B1 11/2007 Slomiany et al.
7,309,281 B2 12/2007 Baerlocher et al.
7,311,607 B2 12/2007 Tedsen et al.
7,314,409 B2 1/2008 Maya et al.
7,318,773 B2 1/2008 Baerlocher
7,331,862 B2 2/2008 Rodgers et al.
7,331,866 B2 2/2008 Rodgers et al.
7,335,102 B2 2/2008 Baerlocher et al.
7,338,367 B2 3/2008 Kaminkow et al.
7,341,518 B2 3/2008 Muskin
7,351,141 B2 4/2008 Rodgers et al.
7,354,344 B2 4/2008 Paulsen et al.
7,357,713 B2 4/2008 Marks et al.
7,371,168 B2 5/2008 Bilyeu et al.
7,371,169 B2 5/2008 Baerlocher
7,371,170 B2 5/2008 Cregan et al.
7,396,279 B2 7/2008 Berman et al.
7,399,225 B2 7/2008 Kaminkow
7,402,102 B2 7/2008 Marks et al.
7,419,431 B2 9/2008 Gauselmann et al.
7,442,123 B2 10/2008 Brill et al.
7,448,948 B2 11/2008 Hughs-Baird et al.
7,594,851 B2 9/2009 Falconer
7,611,406 B2 11/2009 Fuller
7,699,698 B2 4/2010 Randall
7,758,417 B2 7/2010 Jorasch et al.
7,806,764 B2 10/2010 Brosnan et al.
7,901,294 B2 3/2011 Walker et al.
8,162,741 B2 * 4/2012 Wadleigh et al. ............... 463/20
8,323,091 B2 12/2012 Frank et al.
8,366,538 B1 2/2013 Saunders et al.
8,371,930 B1 2/2013 Saunders et al.
2002/0010017 A1 1/2002 Bennett
2002/0025850 A1 2/2002 Hafezi
2002/0052233 A1 5/2002 Gauselmann
2002/0068623 A1 6/2002 Gauselmann
2002/0077167 A1 6/2002 Merari
2003/0013518 A1 1/2003 Graham
2003/0027628 A1 2/2003 Luciano
2003/0036422 A1 2/2003 Baerlocher et al.
2003/0045345 A1 3/2003 Berman
2003/0054874 A1 3/2003 Kaminkow
2003/0057645 A1 3/2003 Baerlocher et al.
2003/0060267 A1 3/2003 Glavich et al.
2003/0092480 A1 5/2003 White et al.
2003/0100356 A1 5/2003 Brown et al.
2003/0125100 A1 7/2003 Cannon
2003/0153382 A1 8/2003 Vancura
2003/0157981 A1 8/2003 Marks et al.
2003/0203752 A1 10/2003 Kaminkow et al.
2003/0203753 A1 10/2003 Muir et al.
2003/0207710 A1 11/2003 Rodgers et al.
2004/0012145 A1 1/2004 Inoue
2004/0014516 A1 1/2004 Inoue
2004/0014517 A1 1/2004 Inoue
2004/0018866 A1 1/2004 Inoue
2004/0026854 A1 2/2004 Inoue
2004/0033827 A1 2/2004 Gilmore et al.
2004/0033829 A1 * 2/2004 Pacey et al. ..................... 463/20
2004/0036218 A1 2/2004 Inoue
2004/0038726 A1 2/2004 Inoue
2004/0043809 A1 3/2004 Gomez et al.
2004/0043815 A1 3/2004 Kaminkow
2004/0048650 A1 3/2004 Mierau et al.
2004/0048651 A1 3/2004 Vorias et al.
2004/0053669 A1 3/2004 Gerrard et al.
2004/0053672 A1 3/2004 Baerlocher
2004/0053676 A1 3/2004 Rodgers
2004/0053677 A1 3/2004 Hughs-Baird
2004/0067790 A1 4/2004 Peterson et al.
2004/0072612 A1 4/2004 Rodgers et al.
2004/0092302 A1 5/2004 Gauselmann
2004/0097280 A1 5/2004 Gauselmann
2004/0102236 A1 5/2004 Suda et al.
2004/0137981 A1 7/2004 Gauselmann
2004/0137982 A1 7/2004 Cuddy et al.
2004/0147306 A1 7/2004 Randall et al.
2004/0152509 A1 8/2004 Hornik et al.
2004/0192431 A1 9/2004 Singer et al.
2004/0242313 A1 12/2004 Munoz
2005/0020344 A1 1/2005 Kaminkow
2005/0049035 A1 3/2005 Baerlocher et al.
2005/0054405 A1 3/2005 Baerlocher et al.
2005/0054418 A1 3/2005 Baerlocher
2005/0054429 A1 3/2005 Baerlocher et al.
2005/0059446 A1 3/2005 Kaminkow
2005/0059474 A1 3/2005 O'Halloran
2005/0059477 A1 3/2005 Baerlocher
2005/0064924 A1 3/2005 Glavich et al.
2005/0070354 A1 3/2005 Baerlocher et al.
2005/0071023 A1 3/2005 Gilliland et al.
2005/0096121 A1 5/2005 Gilliland et al.
2005/0101372 A1 5/2005 Mierau et al.
2005/0101380 A1 5/2005 Glavich et al.
2005/0107158 A1 5/2005 Kanisawa et al.
2005/0148381 A1 7/2005 Marks et al.
2005/0148384 A1 7/2005 Marks et al.
2005/0164774 A1 7/2005 Gauselmann
2005/0187004 A1 8/2005 Vancura
2005/0192081 A1 9/2005 Marks et al.
2005/0208994 A1 9/2005 Berman
2005/0227754 A1 10/2005 Kaminkow et al.
2005/0233794 A1 10/2005 Cannon et al.
2005/0282620 A1 12/2005 Marks et al.

(56) References Cited

U.S. PATENT DOCUMENTS

| | | | |
|---|---|---|---|
| 2006/0030387 | A1 | 2/2006 | Jackson |
| 2006/0030392 | A1 | 2/2006 | Rodgers et al. |
| 2006/0040728 | A1 | 2/2006 | Fuller |
| 2006/0046830 | A1 | 3/2006 | Webb |
| 2006/0058095 | A1 | 3/2006 | Berman et al. |
| 2006/0058097 | A1 | 3/2006 | Berman et al. |
| 2006/0063584 | A1 | 3/2006 | Brill et al. |
| 2006/0068875 | A1 | 3/2006 | Cregan et al. |
| 2006/0068882 | A1 | 3/2006 | Baerlocher et al. |
| 2006/0068883 | A1 | 3/2006 | Randall et al. |
| 2006/0068884 | A1 | 3/2006 | Baerlocher et al. |
| 2006/0068885 | A1 | 3/2006 | Cregan et al. |
| 2006/0073872 | A1 | 4/2006 | B-Jensen et al. |
| 2006/0073876 | A1 | 4/2006 | Cuddy |
| 2006/0073879 | A1 | 4/2006 | Baerlocher |
| 2006/0084493 | A1 | 4/2006 | Pederson et al. |
| 2006/0084494 | A1 | 4/2006 | Belger et al. |
| 2006/0135247 | A1 | 6/2006 | Baerlocher et al. |
| 2006/0172795 | A1 | 8/2006 | Bussick et al. |
| 2006/0172796 | A1 | 8/2006 | Vancura |
| 2006/0199636 | A1 | 9/2006 | Ching et al. |
| 2006/0199637 | A1 | 9/2006 | Ching et al. |
| 2006/0252508 | A1 | 11/2006 | Walker et al. |
| 2006/0264254 | A1 | 11/2006 | Aoki |
| 2007/0004489 | A1 | 1/2007 | Rodgers et al. |
| 2007/0010316 | A1 | 1/2007 | Baerlocher et al. |
| 2007/0021175 | A1 | 1/2007 | Rodgers et al. |
| 2007/0021187 | A1 | 1/2007 | Gauselmann |
| 2007/0021188 | A1 | 1/2007 | Rodgers et al. |
| 2007/0026923 | A1 | 2/2007 | Muir |
| 2007/0060246 | A1 | 3/2007 | Baerlocher et al. |
| 2007/0060248 | A1 | 3/2007 | Rodgers et al. |
| 2007/0060294 | A1 | 3/2007 | Cuddy et al. |
| 2007/0087812 | A1 | 4/2007 | Glavich et al. |
| 2007/0232382 | A1 | 10/2007 | Berman |
| 2007/0232383 | A1 | 10/2007 | Berman |
| 2007/0287523 | A1 | 12/2007 | Esses et al. |
| 2008/0009334 | A1 | 1/2008 | Walker et al. |
| 2008/0045309 | A1 | 2/2008 | Okada |
| 2008/0045322 | A1 | 2/2008 | Berman |
| 2008/0051174 | A1 | 2/2008 | Fiden |
| 2008/0064485 | A1 | 3/2008 | Tedsen et al. |
| 2008/0090655 | A1 | 4/2008 | Marks et al. |
| 2008/0102931 | A1 | 5/2008 | Marks et al. |
| 2008/0102934 | A1 | 5/2008 | Tan |
| 2008/0108409 | A1 | 5/2008 | Cole et al. |
| 2008/0108411 | A1 | 5/2008 | Jensen et al. |
| 2008/0113735 | A1 | 5/2008 | Maya |
| 2008/0113765 | A1 | 5/2008 | DeWaal |
| 2008/0139298 | A1 | 6/2008 | Rodgers et al. |
| 2008/0161097 | A1 | 7/2008 | Baerlocher et al. |
| 2008/0176634 | A1 | 7/2008 | Berman et al. |
| 2008/0176635 | A1 | 7/2008 | Randall |
| 2008/0182644 | A1 | 7/2008 | Lutnick et al. |
| 2008/0188278 | A1 | 8/2008 | Paulsen et al. |
| 2008/0200232 | A1 | 8/2008 | Baerlocher et al. |
| 2008/0207305 | A1 | 8/2008 | Cregan et al. |
| 2008/0214283 | A1 | 9/2008 | Cregan et al. |
| 2008/0227541 | A1 | 9/2008 | Berman et al. |
| 2008/0287178 | A1 | 11/2008 | Berman et al. |
| 2008/0287179 | A1 | 11/2008 | Berman et al. |
| 2009/0117999 | A1 | 5/2009 | Johnson et al. |
| 2009/0124325 | A1 | 5/2009 | Wadleigh et al. |
| 2009/0124342 | A1 | 5/2009 | Fong |
| 2009/0227337 | A1 | 9/2009 | Langille et al. |
| 2010/0004049 | A1 | 1/2010 | Ching et al. |
| 2010/0004050 | A1 | 1/2010 | Caputo et al. |
| 2010/0022297 | A1 | 1/2010 | Saunders |
| 2010/0120507 | A1 | 5/2010 | Rodgers et al. |
| 2010/0203966 | A1 | 8/2010 | Weiss |
| 2010/0222134 | A1 | 9/2010 | Gagner et al. |
| 2010/0248821 | A1 | 9/2010 | Jorasch et al. |
| 2011/0086695 | A1 | 4/2011 | Evans |
| 2011/0111825 | A1 | 5/2011 | Caputo |
| 2011/0111842 | A1 | 5/2011 | Walker et al. |
| 2011/0130193 | A1 | 6/2011 | Belger et al. |
| 2011/0218024 | A1 | 9/2011 | Baerlocher |
| 2013/0023325 | A1 | 1/2013 | Saunders et al. |

FOREIGN PATENT DOCUMENTS

| | | |
|---|---|---|
| WO | WO 99/10849 | 3/1999 |
| WO | WO 01/82245 | 11/2001 |
| WO | WO 02/099760 | 12/2002 |
| WO | WO 2005/079242 | 9/2004 |
| WO | WO 2006/076294 | 7/2006 |
| WO | WO 2007/002935 | 1/2007 |
| WO | WO 2007/130443 | 11/2007 |
| WO | WO 2007/130444 | 11/2007 |

OTHER PUBLICATIONS

Description of Silver Sword video slot game, WMS Copyright 2013, available at http://www.wms.com/Games/Video/InnovationSeries/SuperMulti-Pay/Pages/SilverSword.aspx (2 pages).

* cited by examiner

GAMING SYSTEM AND METHOD PROVIDING A MULTIPLAY SLOT GAME INCLUDING A CASCADING SYMBOLS FEATURE IN WHICH SYMBOLS ARE REMOVED FROM CORRESPONDING SYMBOL DISPLAY AREAS OF DIFFERENT SETS OF SYMBOL DISPLAY AREAS

COPYRIGHT NOTICE

A portion of the disclosure of this patent document contains or may contain material that is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming systems that provide players awards in primary or base games are well known. These gaming systems generally require a player to place a wager to activate a play of the primary game. For many of these gaming systems, any award provided to a player for a wagered-on play of a primary game is based on the player obtaining a winning symbol or a winning symbol combination and on an amount of the wager (e.g., the higher the amount of the wager, the higher the award). Winning symbols or winning symbol combinations that are less likely to occur typically result in higher awards being provided when they do occur.

For such known gaming systems, an amount of a wager placed on a primary game by a player may vary. For instance, a gaming system may enable a player to wager a minimum quantity of credits, such as one credit (e.g., in monetary currency, one penny, nickel, dime, quarter, or dollar; in non-monetary currency, one point, credit, coin, token, free play credit, or virtual buck), up to a maximum quantity of credits, such as five credits. The gaming system may enable the player to place this wager a single time or multiple times for a single play of the primary game. For instance, a gaming system configured to operate a slot game may have one or more paylines, and the gaming system may enable a player to place a wager on each of the paylines for a single play of the slot game. Thus, it is known that a gaming system, such as one configured to operate a slot game, may enable players to place wagers of substantially different amounts on each play of a primary game. For example, the amounts of the wagers may range from one credit up to 125 credits (e.g., five credits on each of twenty-five separate paylines). This is also true for other wagering games, such as video draw poker, in which players can place wagers of one or more credits on each hand, and in which multiple hands can be played simultaneously. Accordingly, it should be appreciated that different players play at substantially different wager amounts or levels and substantially different rates of play.

Bonus or secondary games are also known in gaming systems. Such gaming systems usually provide an award to a player for a play of one such bonus game in addition to any awards provided for any plays of any primary games. Bonus games usually do not require an additional wager to be placed by the player to be initiated. Bonus games are typically initiated or triggered upon an occurrence of a designated triggering symbol or designated triggering symbol combination in the primary game. For instance, a gaming system may initiate or trigger a bonus game when a bonus symbol occurs on the payline on the third reel of a three reel slot machine. The gaming systems generally indicates when a bonus game is initiated or triggered through one or more visual and/or audio output devices, such as the reels, lights, speakers, display screens, etc. Part of the enjoyment and excitement of playing certain gaming systems is the initiation or triggering of a bonus game, even before the player knows an amount of a bonus award won via the bonus game.

Certain known gaming systems provide a bonus opportunity, such as a play of a bonus game or an outcome-enhancing feature, upon an occurrence of a mystery triggering event. The mystery triggering event is not displayed to the player and, therefore, the player is unaware of the occurrence of the mystery triggering event, how often the mystery triggering event occurs, the different types of available bonus opportunities associated with the mystery triggering event, and the like.

Various commercially available gaming systems enable players to play more than one wagering game simultaneously. Certain of these gaming systems enable players to play multiple plays of a same wagering game simultaneously, plays of different wagering games simultaneously, or both. Providing a gaming system in which a player may play a plurality of plays of one or more wagering games at once enhances player enjoyment and excitement by reducing the boredom and monotony of playing a single play of the same wagering game several consecutive times at the same gaming system.

Gaming systems that provide games having cascading symbols features are also known. For one such game employing a cascading symbols feature, a gaming system generates and displays a plurality of symbols at a plurality of symbol display areas. The gaming system evaluates the displayed symbols and provides an award for each formed winning symbol combination (if any). The gaming system then removes the displayed symbols that form the winning symbol combination(s) to create one or more empty symbol display areas. The gaming system repositions or shifts zero, one, or more of the remaining displayed symbols into zero, one, or more of the empty symbol display areas. If any empty symbol display areas remain, the gaming system generates and displays a symbol at each empty symbol display area. The gaming system reevaluates the displayed symbols and provides an award for each formed winning symbol combination. The gaming system repeats the steps of removing generated symbols, repositioning or shifting generated symbols, generating new symbols, and evaluating the generated symbols. Repeating the steps as described increases player excitement and enjoyment by providing awards for winning symbol combinations not available after the initial generation of symbols. However, the lack of symbol repositioning (i.e., cascading) that occurs when displayed symbols are removed from a top row of symbol display areas is frustrating for certain players and may detract from what should otherwise be an exciting feature.

Various players continually seek out new and different variations to gaming systems. A continuing need thus exists for gaming systems and methods that provide new, exciting, and engaging games, such as games including new and different cascading symbols features, and that enable players to play multiple games at once.

SUMMARY

Various embodiments of the present disclosure are directed to a gaming system and method providing a multiplay slot game including a cascading symbols feature in which symbols are removed from corresponding symbol display areas of different sets of symbol display areas.

In one embodiment, the gaming system is configured to operate a multiplay slot game. For a play of the multiplay slot game, the gaming system displays a first set of a plurality of symbol display areas and a second different set of a plurality of symbol display areas. For each of the symbol display areas of the first set, that symbol display area corresponds to one of the symbol display areas of the second set. In one example, the symbol display areas of the first set each correspond to different symbol display areas of the second set. For each of the symbol display areas, the gaming system generates and displays one of a plurality of different symbols at that symbol display area. The gaming system makes independent award determinations associated with the symbols displayed at the first set of symbol display areas and the symbols displayed at the second set of symbol display areas, and displays any awards associated with any displayed winning symbol combinations.

If one or more of a plurality of different designated symbol combinations are formed by the symbols displayed at the symbol display areas of the first set, for each of at least one of the formed designated symbol combinations, for each of at least one of the symbols of that formed designated symbol combination, the gaming system removes the symbol displayed at the symbol display area of the second set that corresponds to the symbol display area of the first set at which that symbol is displayed to create an empty symbol display area in the second set. Thereafter, the gaming system determines whether any displayed symbols have a designated spatial relationship with any empty symbol display areas. If at least one displayed symbol has the designated spatial relationship with one or more empty symbol display areas, for each displayed symbol having the designated spatial relationship with one or more empty symbol display areas, the gaming system repositions that displayed symbol to one of those empty symbol display areas to fill that empty symbol display area and create another empty symbol display area. After the repositioning (if any) of the displayed symbols, for each remaining empty symbol display area, the gaming system generates and displays one of the symbols at that empty symbol display area. The gaming system then repeats the process, starting with the award determination.

In another embodiment, the gaming system is configured to operate a multiplay slot game. For a play of the multiplay slot game, the gaming system displays a first set of a plurality of symbol display areas and a second different set of a plurality of symbol display areas. For each of the symbol display areas of the first set, that symbol display area corresponds to one of the symbol display areas of the second set. In one example, the symbol display areas of the first set each correspond to different symbol display areas of the second set. For each of the symbol display areas, the gaming system generates and displays one of a plurality of different symbols at that symbol display area. The gaming system makes independent award determinations associated with the symbols displayed at the first set of symbol display areas and the symbols displayed at the second set of symbol display areas, and displays any awards associated with any displayed winning symbol combinations. If one or more of a plurality of different designated symbol combinations are formed by the symbols displayed at the symbol display areas of the first set, for each of at least one of the formed designated symbol combinations, the gaming system removes at least one of the symbols of that formed designated symbol combination from the symbol display area at which that symbol is displayed to create at least one empty symbol display area in the first set. The gaming system also removes the symbol(s) displayed at the symbol display area(s) of the second set that corresponds to the symbol display area(s) of the first set from which the symbol(s) of the formed designated symbol combination was removed to create at least one empty symbol display area in the second set.

Thereafter, the gaming system determines whether any displayed symbols have a designated spatial relationship with any empty symbol display areas. If at least one displayed symbol has the designated spatial relationship with one or more empty symbol display areas, for each displayed symbol having the designated spatial relationship with one or more empty symbol display areas, the gaming system repositions that displayed symbol to one of those empty symbol display areas to fill that empty symbol display area and create another empty symbol display area. After the repositioning (if any) of the displayed symbols, for each remaining empty symbol display area, the gaming system generates and displays one of the symbols at that empty symbol display area. The gaming system then repeats the process, starting with the award determination.

In another embodiment, the gaming system is configured to operate a multiplay slot game associated with a plurality of different symbols. For a play of the multiplay slot game, the gaming system displays a first set of a plurality of symbol display areas and a second different set of a plurality of symbol display areas. In this embodiment, the symbol display areas of the first set each correspond to different symbol display areas of the second set. For each of the symbol display areas, the gaming system generates and displays one of the symbols at that symbol display area. The gaming system determines if any of a plurality of different winning symbol combinations are formed by the symbols displayed at the symbol display areas of the first set. The gaming system also determines if any of the winning symbol combinations are formed by the symbols displayed at the symbol display areas of the second set. In other words, in this embodiment, the gaming system makes an independent award determination for each of the first and second sets of symbol display areas. The gaming system displays any awards associated with any formed winning symbol combinations.

The gaming system determines whether any of a plurality of different designated symbol combinations are formed by the symbols displayed at the first set of symbol display areas. If none of the designated symbol combinations are formed by any of the symbols displayed at the first set of symbol display areas, the gaming system ends the play of the multiplay slot game. If, on the other hand, at least one of the designated symbol combinations is formed by the symbols displayed at the first set of symbol display areas, the gaming system provides a cascading symbols feature as described below.

More specifically, if at least one of the designated symbol combinations is formed by the symbols displayed at the first set of symbol display areas, for each of those formed designated symbol combinations, for each symbol of that formed designated symbol combination, for each symbol display area of the second set that corresponds to a symbol display area of the first set at which that symbol of that formed designated symbol combination is displayed, the gaming system removes the symbol displayed at that symbol display area to create an empty symbol display area in the second set.

It should thus be appreciated that, in this embodiment, if any of the symbol display areas of the first set displays a symbol included in a formed designated symbol combination, the gaming system removes the symbol(s) displayed at any corresponding symbol display area(s) regardless of and independent of the symbols displayed at that(those) corresponding symbol display area(s).

The gaming system determines whether any displayed symbols have a designated spatial relationship with any empty symbol display areas. If at least one displayed symbol has a designated spatial relationship with one or more empty symbol display areas, for each displayed symbol having the designated spatial relationship with one or more empty symbol display areas, the gaming system repositions that displayed symbol to one of those empty symbol display areas to fill that empty symbol display area and create another empty symbol display area. After the repositioning (if any) of the displayed symbols, for each remaining empty symbol display area, the gaming system generates and displays one of the symbols at that empty symbol display area. The gaming system then repeats the process, starting with the award determination.

In another embodiment, the gaming system is configured to operate a multiplay slot game associated with a plurality of different symbols. For a play of the multiplay slot game, the gaming system displays a first set of a plurality of symbol display areas and a second different set of a plurality of symbol display areas. In this embodiment, the symbol display areas of the first set each correspond to a different one of the symbol display areas of the second set. For each of the symbol display areas, the gaming system generates and displays one of the symbols at that symbol display area. The gaming system determines if any of a plurality of different winning symbol combinations are formed by the symbols displayed at the symbol display areas of the first set. The gaming system also determines if any of the winning symbol combinations are formed by the symbols displayed at the symbol display areas of the second set. In other words, in this embodiment, the gaming system makes an independent award determination for each of the first and second sets of symbol display areas. The gaming system displays any awards associated with any formed winning symbol combinations.

The gaming system determines whether any of a plurality of different designated symbol combinations are formed by the displayed symbols. If none of the designated symbol combinations are formed by any of the displayed symbols, the gaming system ends the play of the multiplay slot game. If, on the other hand, at least one of the designated symbol combinations is formed by the displayed symbols, the gaming system provides a cascading symbols feature as described below.

More specifically, if at least one of the designated symbol combinations is formed by the displayed symbols, the gaming system determines whether one or more of the formed designated symbol combinations are formed by the symbols displayed at the symbol display areas of the first set. If one or more of the formed designated symbol combinations are formed by the symbols displayed at the symbol display areas of the first set, for each of those formed designated symbol combinations: (a) for each of the symbols of that formed designated symbol combination, the gaming system removes that symbol from the symbol display area at which that symbol is displayed to create an empty symbol display area in the first set; and (b) for each symbol display area of the second set that corresponds to a symbol display area of the first set from which a symbol of that formed designated symbol combination was removed, the gaming system removes the symbol displayed at that symbol display area to create an empty symbol display area in the second set.

The gaming system determines whether one or more of the formed designated symbol combinations are formed by the symbols displayed at the symbol display areas of the second set. If one or more of the formed designated symbol combinations are formed by the symbols displayed at the symbol display areas of the second set, for each of those formed designated symbol combinations: (a) for each of the symbols of that formed designated symbol combination, the gaming system removes that symbol from the symbol display area at which that symbol is displayed to create an empty symbol display area in the second set; and (b) for each symbol display area of the first set that corresponds to a symbol display area of the second set from which a symbol of that formed designated symbol combination was removed, the gaming system removes the symbol displayed at that symbol display area to create an empty symbol display area in the first set.

It should thus be appreciated that, in this embodiment, if any of the symbol display areas displays a symbol included in a formed designated symbol combination, the gaming system removes the symbol displayed at that symbol display area and removes the symbol(s) displayed at any corresponding symbol display area(s) regardless of and independent of the symbols displayed at that(those) corresponding symbol display area(s).

The gaming system determines whether any displayed symbols have a designated spatial relationship with any empty symbol display areas. If at least one displayed symbol has a designated spatial relationship with one or more empty symbol display areas, for each displayed symbol having the designated spatial relationship with one or more empty symbol display areas, the gaming system repositions that displayed symbol to one of those empty symbol display areas to fill that empty symbol display area and create another empty symbol display area. After the repositioning (if any) of the displayed symbols, for each remaining empty symbol display area, the gaming system generates and displays one of the symbols at that empty symbol display area. The gaming system then repeats the process, starting with the award determination.

It should thus be appreciated that the gaming system and method of the present disclosure provide new and different cascading symbols features, thereby increasing player enjoyment, entertainment, and excitement.

Additional features and advantages are described herein, and will be apparent from, the following Detailed Description and the Figures.

DETAILED DESCRIPTION

Multiplay Slot Game Including a Cascading Symbols Feature in which Symbols are Removed from Corresponding Symbol Display Areas of Different Sets of Symbol Display Areas Various embodiments of the present disclosure are directed to a gaming system and method providing a multiplay slot game including a cascading symbols feature in which symbols are removed from corresponding symbol display areas of different sets of symbol display areas. While the multiplay slot game of the present disclosure is employed as a primary game in the embodiments described below, it should be appreciated that the multiplay slot game may additionally or alternatively be employed as or in association with a bonus game or a secondary game. Moreover, while any credit balances, any wagers, and any awards are displayed as an amount of monetary credits or currency in the embodiments described below, one or more of such credit balances, such wagers, and such awards may be for non-monetary credits, promotional credits, and/or player tracking points or credits.

Figure 1A:
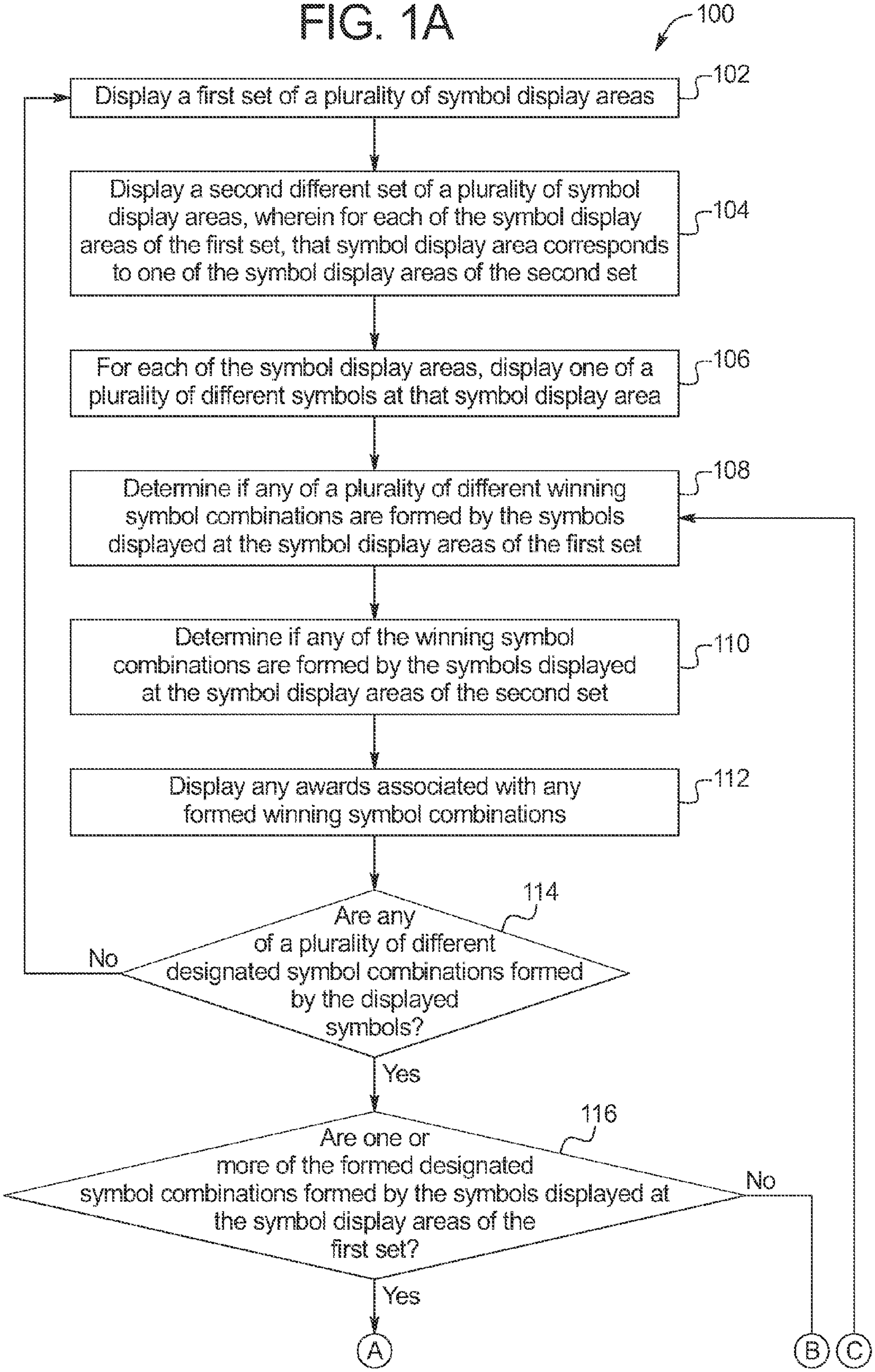
FIGS. 1A and 1B illustrate a flowchart illustrating a method of operating an example embodiment of the gaming system of the present disclosure.
Figure 1B:
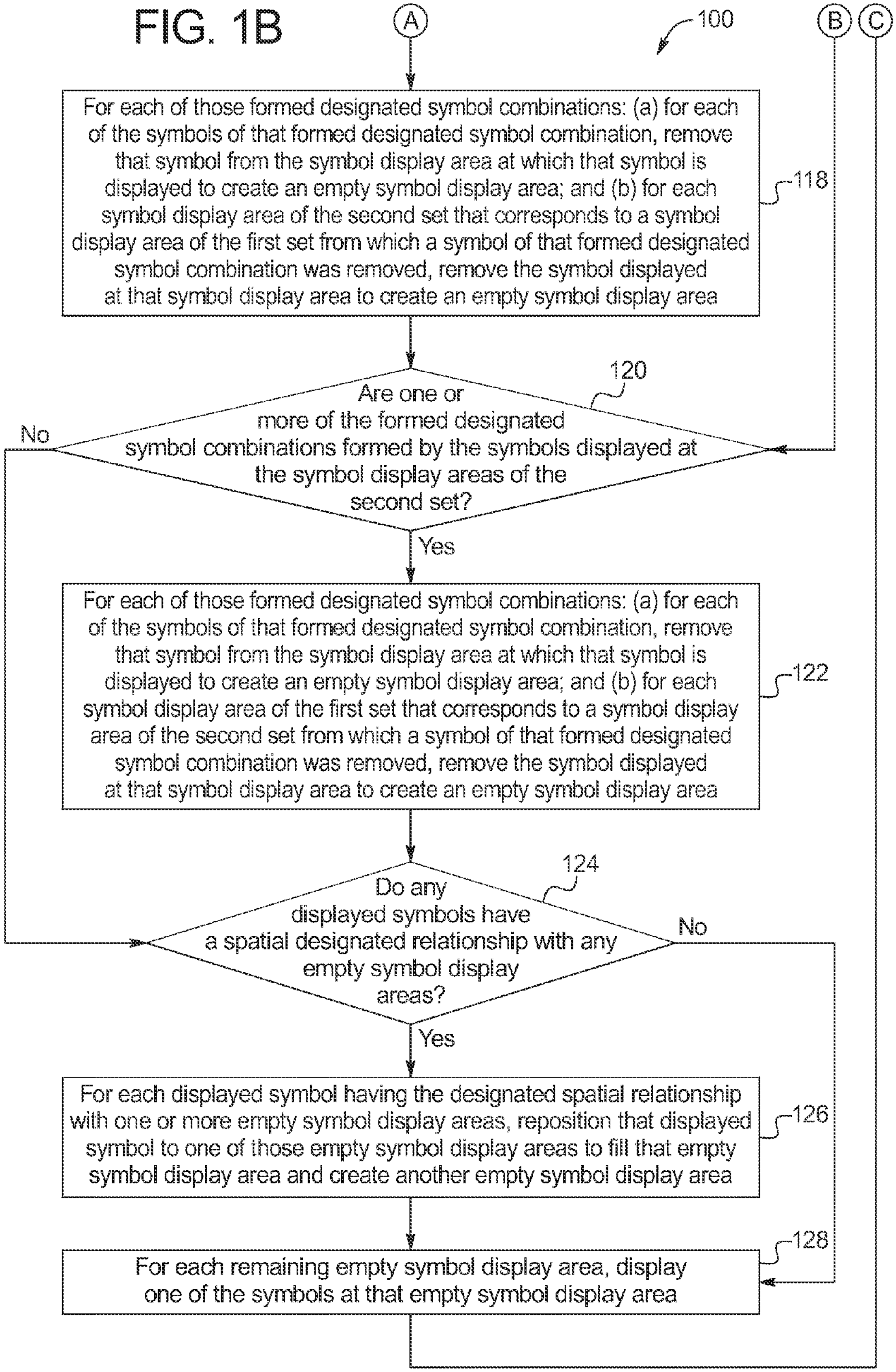

FIGS. 1A and 1B illustrate a flowchart of an example process or method 100 of operating the gaming system of the present disclosure. In various embodiments, process 100 is represented by a set of instructions stored in one or more memories and executed by one or more processors. Although process 100 is described with reference to the flowchart shown in FIGS. 1A and 1B, it should be appreciated that many other processes of performing the acts associated with this illustrated process 100 may be employed. For example, the order of certain of the illustrated blocks and/or diamonds may be changed, certain of the illustrated blocks and/or diamonds may be optional, and/or certain of the illustrated blocks and/or diamonds may not be employed.

In this example, the gaming system is configured to operate a multiplay slot game associated with a plurality of different symbols. For a play of the multiplay slot game, the gaming system displays a first set of a plurality of symbol display areas, as indicated by block 102. The gaming system displays a second different set of a plurality of symbol display areas, as indicated by block 104. In this example, the symbol display areas of the first set each correspond to different symbol display areas of the second set.

In other embodiments, each of at least one of, but fewer than all of, the symbol display areas of the first set corresponds to one of the symbol display areas of the second set. In other embodiments, each of one or more designated symbol display areas of the first set corresponds to at least one symbol display area of the second set. In certain embodiments, at least one of the symbol display areas of the first set corresponds to a plurality of the symbol display areas of the second set. In other embodiments, at least two symbol display areas of the first set correspond to a same one of the symbol display areas of the second set. In various embodiments, at least one of the symbol display areas of the first set corresponds to at least one of the symbol display areas of the first set instead of, or in addition to, corresponding to at least one of the symbol display areas of the second set. It should be appreciated that any of the above-described variations may be employed with an embodiment in which each of the symbol display areas of the first set are displayed by a gaming system played by a first player and each of the symbol display areas of the second set are displayed by a gaming system played by a second different player. For instance, in one example, the symbol display areas of the first set (displayed by the first player's gaming system) are each associated with different symbol display areas of the second set (displayed by the second player's gaming system). In such embodiments, the symbol display areas of each player affect the symbol display areas of at least one other player, and each player's symbol display areas are being affected by at least one other player's symbol display areas.

Returning to process 100, in this example, for each of the symbol display areas, the gaming system displays one of the symbols at that symbol display area, as indicated by block 106. The gaming system determines if any of a plurality of different winning symbol combinations are formed by the symbols displayed at the symbol display areas of the first set, as indicated by block 108. The gaming system also determines if any of the winning symbol combinations are formed by the symbols displayed at the symbol display areas of the second set, as indicated by block 110. In other words, in this example, the gaming system makes an independent award determination for each of the first and second sets of symbol display areas. The gaming system displays any awards associated with any formed winning symbol combinations, as indicated by block 112.

The gaming system determines whether any of a plurality of different designated symbol combinations are formed by the displayed symbols, as indicated by diamond 114. In certain embodiments, the designated symbol combinations include at least one of the winning symbol combinations. In other embodiments, the designated symbol combinations do not include any of the winning symbol combinations. If none of the designated symbol combinations are formed by any of the displayed symbols, process 100 returns to block 102 for another play of the multiplay slot game. If, on the other hand, at least one of the designated symbol combinations is formed by the displayed symbols, the gaming system provides a cascading symbols feature as described below.

More specifically, if at least one of the designated symbol combinations is formed by the displayed symbols, the gaming system determines whether one or more of the formed designated symbol combinations are formed by the symbols displayed at the symbol display areas of the first set, as indicated by diamond 116. If not, process 100 proceeds to diamond 120, described below. If, on the other hand, one or more of the formed designated symbol combinations are formed by the symbols displayed at the symbol display areas of the first set, for each of those formed designated symbol combinations: (a) for each of the symbols of that formed designated symbol combination, the gaming system removes that symbol from the symbol display area at which that symbol is displayed to create an empty symbol display area in the first set; and (b) for each symbol display area of the second set that corresponds to a symbol display area of the first set from which a symbol of that formed designated symbol combination was removed, the gaming system removes the symbol displayed at that symbol display area to create an empty symbol display area in the second set, as indicated by block 118.

The gaming system determines whether one or more of the formed designated symbol combinations are formed by the symbols displayed at the symbol display areas of the second set, as indicated by diamond 120. If not, process 100 proceeds to diamond 124, described below. If, on the other hand, one or more of the formed designated symbol combinations are formed by the symbols displayed at the symbol display areas of the second set, for each of those formed designated symbol combinations: (a) for each of the symbols of that formed designated symbol combination, the gaming system removes that symbol from the symbol display area at which that symbol is displayed to create an empty symbol display area in the second set; and (b) for each symbol display area of the first set that corresponds to a symbol display area of the second set from which a symbol of that formed designated symbol combination was removed, the gaming system removes the symbol displayed at that symbol display area to create an empty symbol display area in the first set, as indicated by block 122.

It should thus be appreciated that, in this example, if any of the symbol display areas displays a symbol included in a formed designated symbol combination, the gaming system removes the symbol displayed at that symbol display area and removes the symbol(s) displayed at any corresponding symbol display area(s) regardless of and independent of the symbols displayed at that(those) corresponding symbol display area(s).

In other embodiments, the gaming system removes at least one of, but fewer than all of, the symbols of a formed designated symbol combination from the symbol display area(s) from which that at least one symbol(s) is displayed. For instance, for each formed designated symbol combination, the gaming system removes one symbol of that formed designated symbol combination from the symbol display area at which that symbol is displayed. In further embodiments, the gaming system removes at least one of the symbols of each of at least one of, but fewer than all of, the formed designated symbol combinations from the symbol display area(s) at which that at least one symbol(s) is displayed. For instance, if the displayed symbols form three designated symbol combinations, the gaming system removes at least one symbol of each of two of the three formed designated symbol combinations from the symbol display areas at which those symbols are displayed.

In other embodiments, the gaming system removes the symbols displayed at at least one of, but fewer than all of, the symbol display areas corresponding to the symbol display areas from which the symbols of a formed designated symbol combination were removed. For instance, for a designated symbol combination formed by symbols displayed at five symbol display areas, the gaming system removes the symbols displayed at three of the five corresponding symbol display areas. In further embodiments, the gaming system removes the symbols displayed at at least one of the symbol display areas corresponding to the symbol display areas from which the symbols of at least one designated symbol combination were removed. For instance, if three designated symbol combinations are displayed, the gaming system removes the symbols displayed at the symbol display areas corresponding to the symbol display areas from which the symbols forming two of the three designated symbol combinations were removed.

Returning to process 100, in this example, the gaming system determines whether any displayed symbols have a designated spatial relationship with any empty symbol display areas, as indicated by diamond 124. If not, process 100 proceeds to block 128, described below. If, on the other hand, at least one displayed symbol has a designated spatial relationship with one or more empty symbol display areas, for each displayed symbol having the designated spatial relationship with one or more empty symbol display areas, the gaming system repositions that displayed symbol to one of those empty symbol display areas to fill that empty symbol display area and create another empty symbol display area, as indicated by block 126.

In one embodiment, a displayed symbol has the designated spatial relationship with an empty symbol display area if the displayed symbol is located above that empty symbol display area, and the gaming system repositions that displayed symbol downward into that empty symbol display area. In another embodiment, a displayed symbol has the designated spatial relationship with an empty symbol display area if the displayed symbol is located below that empty symbol display area, and the gaming system repositions that displayed symbol upward into that empty symbol display area. In another embodiment, a displayed symbol has the designated spatial relationship with an empty symbol display area if the displayed symbol is located to the left of that empty symbol display area, and the gaming system repositions that displayed symbol to the right into that empty symbol display area. In another embodiment, a displayed symbol has the designated spatial relationship with an empty symbol display area if the displayed symbol is located to the right of that empty symbol display area, and the gaming system repositions that displayed symbol to the left into that empty symbol display area.

In other embodiments, the gaming system repositions at least one of, but fewer than all of, the symbols having the designated spatial relationship with one or more empty symbol display areas. In further embodiments, the gaming system repositions a displayed symbol if that displayed symbol is a designated symbol, such as a wild symbol, and does not reposition a displayed symbol if that displayed symbol is not a designated symbol.

Returning to process 100, in this example, after repositioning any displayed symbols, for each remaining empty symbol display area (i.e., for each empty symbol display area not filled by the repositioning (if any) of the displayed symbols and for each empty symbol display area created by the repositioning (if any) of the displayed symbols), the gaming system displays one of the symbols at that empty symbol display area, as indicated by block 128. Process 100 then returns to block 108.

FIGS. 2A, 2B, 2C, 2D, 2E, 2F, 2G, and 2H illustrate screen shots of the gaming system of the present disclosure providing an example play of the multiplay slot game according to process 100 described above. In this example, the multiplay slot game includes two sets of reels associated with a plurality of different symbols, though it should be appreciated that any suitable quantity of reels may be employed. The gaming system displays (such as on display device 1116 or 1118, described below) a first set of reels including reels 210*a*, 210*b*, 210*c*, 210*d*, and 210*e* above a second set of reels including reels 310*a*, 310*b*, 310*c*, 310*d*, and 310*e* such that: reel 210*a* is generally aligned with reel 310*a*, reel 210*b* is generally aligned with reel 310*b*, reel 210*c* is generally aligned with reel 310*c*, reel 210*d* is generally aligned with reel 310*d*, and reel 210*e* is generally aligned with reel 310*e*.

The gaming system displays the first set of reels in association with a first set of a plurality of symbol display areas 200 including symbol display areas 220*a*, 220*b*, 220*c*, 220*d*, 220*e*, 220*f*, 220*g*, 220*h*, 220*i*, 220*j*, 220*k*, 220*l*, 220*m*, 220*n*, and 220*o* arranged in a 3×5 matrix. More specifically, in this example, the gaming system displays: reel 210*a* in association with symbol display areas 220*a*, 220*f*, and 220*k*; reel 210*b* in association with symbol display areas 220*b*, 220*g*, and 220*l*; reel 210*c* in association with symbol display areas 220*c*, 220*h*, and 220*m*; reel 210*d* in association with symbol display areas 220*d*, 220*i*, and 220*n*; and reel 210*e* in association with symbol display areas 220*e*, 220*j*, and 220*o*.

Similarly, the gaming system displays the second set of reels in association with a second set of a plurality of symbol display areas 320*a*, 320*b*, 320*c*, 320*d*, 320*e*, 320*f*, 320*g*, 320*h*, 320*i*, 320*j*, 320*k*, 320*l*, 320*m*, 320*n*, and 320*o* arranged in a 3×5 matrix. More specifically, in this example, the gaming system displays: reel 310*a* in association with symbol display areas 320*a*, 320*f*, and 320*k*; reel 310*b* in association with symbol display areas 320*b*, 320*g*, and 320*l*; reel 310*c* in association with symbol display areas 320*c*, 320*h*, and 320*m*; reel 310*d* in association with symbol display areas 320*d*, 320*i*, and 320*n*; and reel 310*e* in association with symbol display areas 320*e*, 320*j*, and 320*o*.

For each of the sets of reels and associated symbol display areas, the gaming system displays a plurality of paylines, each of which is associated with a different plurality of the symbol display areas. In this example, payline 215*a* is associated with symbol display areas 220*a*, 220*b*, 220*c*, 220*d*, and 220*e*; payline 215*b* is associated with symbol display areas 220*f*, 220*g*, 220*h*, 220*i*, and 220*j*; payline 215*c* is associated with symbol display areas 220*k*, 220*l*, 220*m*, 220*n*, and 320*o*; payline 215*d* is associated with symbol display areas 220*a*, 220*g*, 220*m*, 220*i*, and 220*e*; and payline 215*e* is associated with symbol display areas 220*k*, 220*g*, 220*c*, 220*i*, and 220*o*. Similarly, in this example, payline 315*a* is associated with symbol display areas 320*a*, 320*b*, 320*c*, 320*d*, and 320*e*; payline 315*b* is associated with symbol display areas 320*f*, 320*g*, 320*h*, 320*i*, and 320*j*; payline 315*c* is associated with symbol display areas 320*k*, 320*l*, 320*m*, 320*n*, and 320*o*; payline 315*d* is associated with symbol display areas 320*a*, 320*g*, 320*m*, 320*i*, and 320*e*; and payline 315*e* is associated with symbol display areas 320*k*, 320*g*, 320*c*, 320*i*, and 320*o*.

In this example, each of the symbol display areas of the first set of symbol display areas corresponds to a different one of the symbol display areas of the second set of symbol display areas. Here, the symbol display areas of the first and second sets that share the same positions in their respective 3×5 matrices correspond to one another. More specifically, symbol display areas 220*a* and 320*a* correspond to one another, symbol display areas 220*b* and 320*b* correspond to one another, symbol display areas 220*c* and 320*c* correspond to one another, symbol display areas 220*d* and 320*d* correspond to one another, symbol display areas 220*e* and 320*e* correspond to one another, symbol display areas 220*f* and 320*f* correspond to one another, symbol display areas 220*g* and 320*g* correspond to one another, symbol display areas 220*h* and 320*h* correspond to one another, symbol display areas 220*i* and 320*i* correspond to one another, symbol display areas 220*j* and 320*j* correspond to one another, symbol display areas 220*k* and 320*k* correspond to one another, symbol display areas 220*l* and 320*l* correspond to one another, symbol display areas 220*m* and 320*m* correspond to one another, symbol display areas 220*n* and 320*n* correspond to one another, and symbol display areas 320*o* and 320*o* correspond to one another.

The gaming system also displays a message box 260 that displays messages or indications before, during, or after play of the multiplay slot game, and a plurality of meters including: a credit meter 270 that displays the player's credit balance, a wager meter 280 that displays any wager placed on a play of the multiplay slot game, and an award meter 290 that displays the any awards won during the play of the multiplay slot game. While in this illustrated example the gaming system indicates any awards in the form of amounts of credits, it should be appreciated that such indications may alternatively or additionally be made in the form of amounts of currency.

Figure 2A:
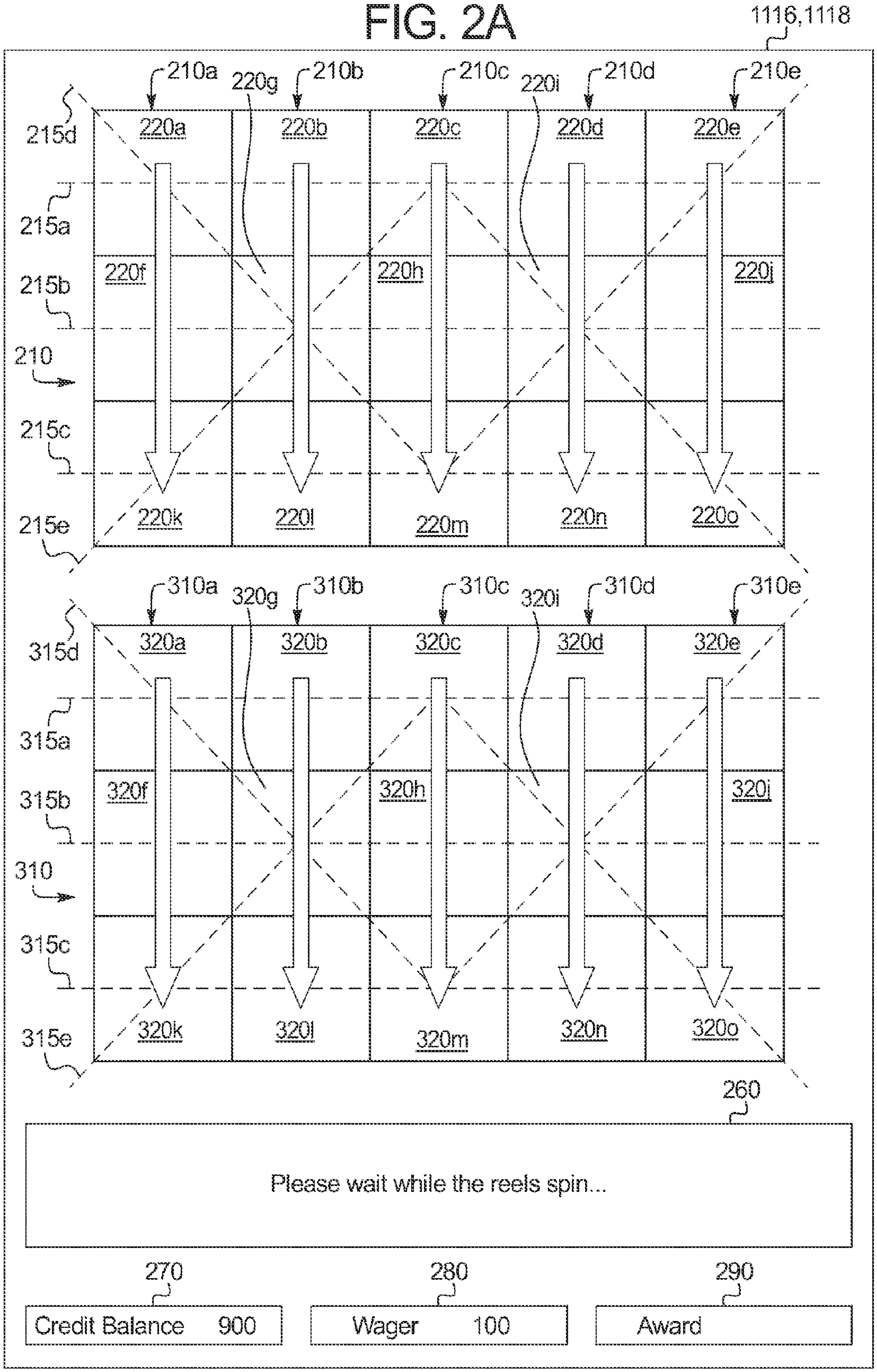
FIGS. 2A, 2B, 2C, 2D, 2E, 2F, 2G, and 2H illustrate screen shots of the gaming system of the present disclosure operating an example of the multiplay slot game of the present disclosure according to the method of FIGS. 1A and 1B.

As illustrated in FIG. 2A, upon placement of a wager of (100 credits in this example, as indicated by wager meter 280), the gaming system initiates a play of the multiplay slot game and displays each of the reels of the first and second set of reels spinning. The gaming system displays the following message in message box 260: "PLEASE WAIT WHILE THE REELS SPIN . . . ."

Figure 2B:
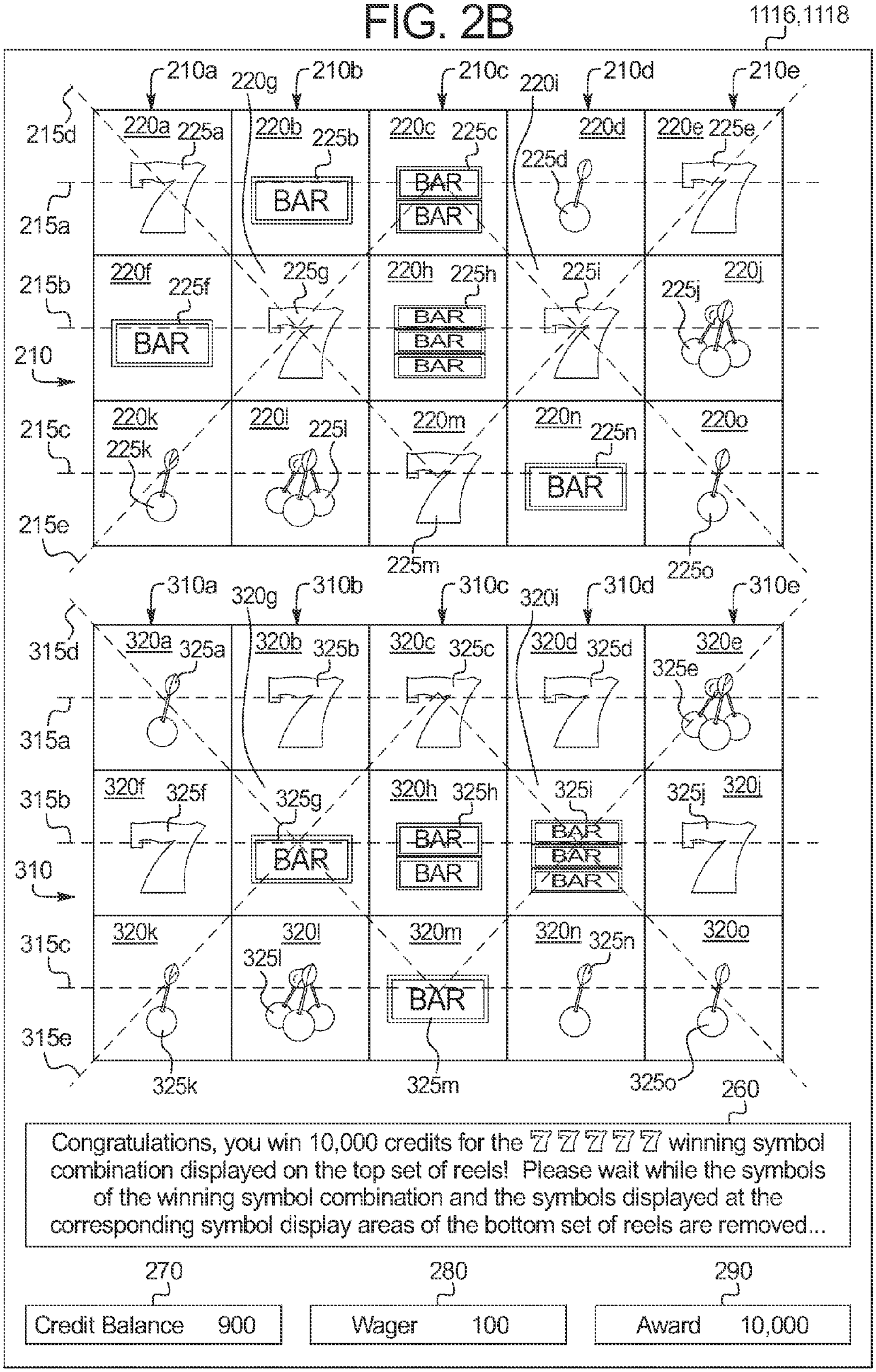

As illustrated in FIG. 2B, the gaming system stops the reels such that a plurality of the symbols are displayed at the symbol display areas. In this illustrated example, with respect to the first set of reels and the first set of symbol display areas 200, the gaming system displays: Seven symbol 225*a* at symbol display area 220*a*, Bar symbol 225*b* at symbol display area 220*b*, Double Bar symbol 225*c* at symbol display area 220*c*, Cherry symbol 225*d* at symbol display area 220*d*, Seven symbol 225*e* at symbol display area 220*e*, Bar symbol 225*f* at symbol display area 220*f*, Seven symbol 225*g* at symbol display area 220*g*, Triple Bar symbol 225*h* at symbol display area 220*h*, Seven symbol 225*i* at symbol display area 220*i*, Triple Cherry symbol 225*j* at symbol display area 220*j*, Cherry symbol 225*k* at symbol display area 220*k*, Triple Cherry symbol 225*l* at symbol display area 220*l*, Seven symbol 225*m* at symbol display area 220*m*, Bar symbol 225*n* at symbol display area 220*n*, and Cherry symbol 225*o* at symbol display area 220*o*.

Additionally, in this illustrated example, with respect to the second set of reels and the second set of symbol display areas 300, the gaming system displays: Cherry symbol 325*a* at symbol display area 320*a*, Seven symbol 325*b* at symbol display area 320*b*, Seven symbol 325*c* at symbol display area 320*c*, Seven symbol 325*d* at symbol display area 320*d*, Triple Cherry symbol 325*e* at symbol display area 320*e*, Seven symbol 325*f* at symbol display area 320*f*, Bar symbol 325*g* at symbol display area 320*g*, Double Bar symbol 325*h* at symbol display area 320*h*, Triple Bar symbol 325*i* at symbol display area 320*i*, Seven symbol 325*j* at symbol display area 320*j*, Cherry symbol 325*k* at symbol display area 320*k*, Triple Cherry symbol 325*l* at symbol display area 320*l*, Bar symbol 325*m* at symbol display area 320*m*, Cherry symbol 325*n* at symbol display area 320*n*, and Cherry symbol 325*o* at symbol display area 320*o*.

The gaming system makes an independent award determination for each of the sets of reels. In this example, the gaming system determines (based on a paytable, which is not shown) whether the symbols displayed at the first set of symbol display areas 200 form any of a plurality of different winning symbol combinations along paylines 215*a*, 215*b*, 215*c*, 215*d*, and/or 215*e*. In this example, the gaming system determines an award of 10,000 credits associated with the Seven-Seven-Seven-Seven-Seven winning symbol combination displayed along payline 215*d*. The gaming system updates award meter 290 to reflect the 10,000 credit award. Additionally, the gaming system determines whether the symbols displayed at the second set of symbol display areas 300 form any of the winning symbol combinations along paylines 315*a*, 315*b*, 315*c*, 315*d*, and/or 315*e*. In this example, the gaming system determines that none of the winning symbol combinations are formed by the symbols displayed at the second set of symbol display areas 300.

In this example, the designated symbol combinations are the winning symbol combinations included in the paytable (not shown). Here, since at least one winning symbol combination is formed by the symbols displayed at at least one of the sets of symbol display areas, the gaming system provides a cascading symbols feature. More specifically, in this example, for each formed winning symbol combination: (a) for each symbol of that formed winning symbol combination, the gaming system removes that symbol from the symbol display area at which that symbol is displayed to create an empty symbol display area; and (b) for each symbol display area corresponding to a symbol display area from which one of the symbols of that formed winning symbol combination was removed, the gaming system removes the symbol displayed at that symbol display area to create an empty symbol display area. Put differently, in this illustrated example, if any symbol display area displays a symbol included in a formed winning symbol combination, the gaming system removes the symbol from that symbol display area and the symbol(s) displayed at any corresponding symbol display area(s) regardless of and independent of the symbols displayed at that(those) corresponding symbol display area(s).

The gaming system displays the following message in message box 260: "CONGRATULATIONS, YOU WIN 10,000 CREDITS FOR THE 7 7 7 7 7 WINNING SYMBOL COMBINATION DISPLAYED ON THE TOP SET OF REELS! PLEASE WAIT WHILE THE SYMBOLS OF THE WINNING SYMBOL COMBINATION AND THE SYMBOLS DISPLAYED AT THE CORRESPONDING SYMBOL DISPLAY AREAS OF THE BOTTOM SET OF REELS ARE REMOVED . . . ."

Figure 2C:
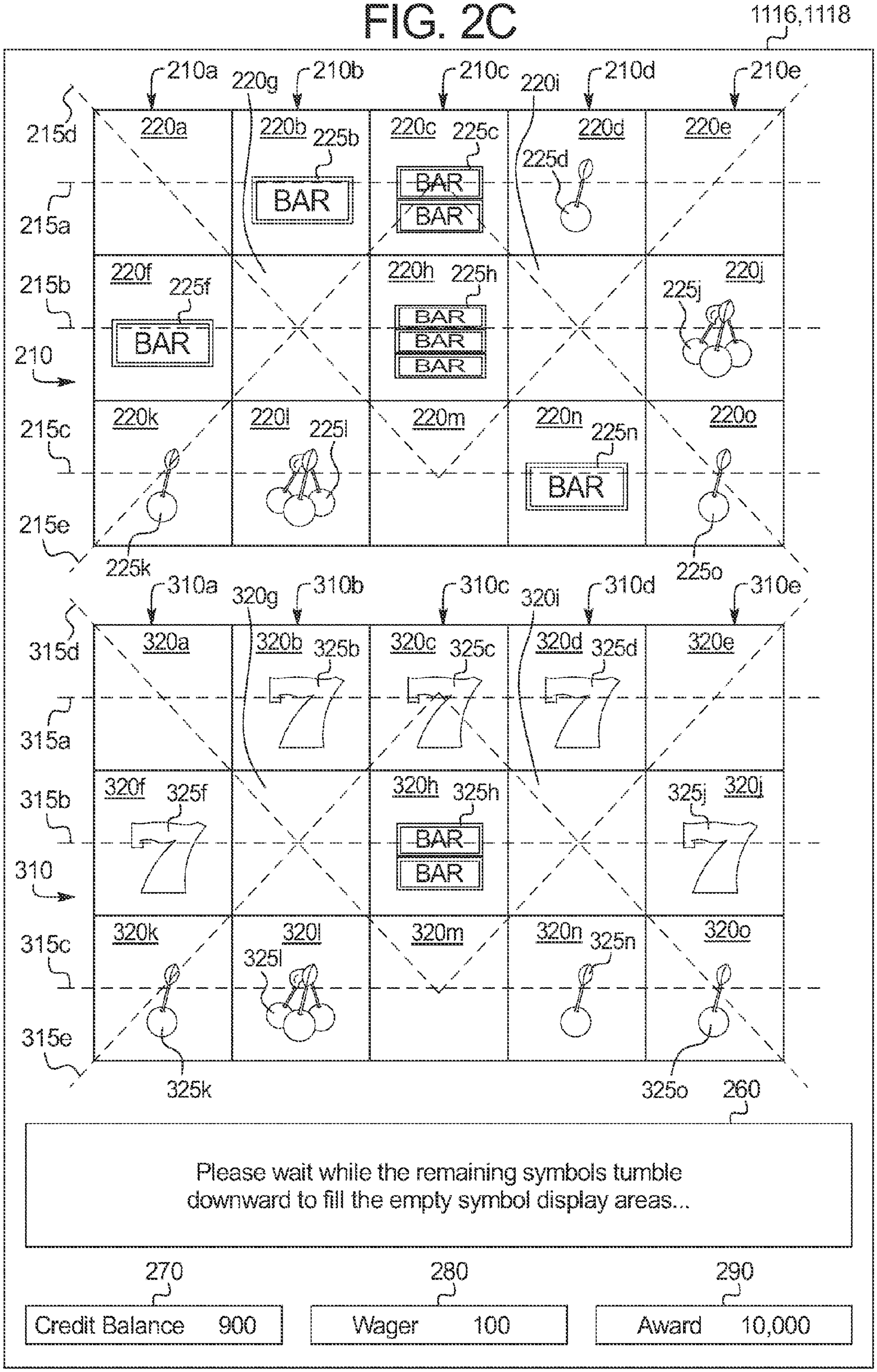

As illustrated in FIG. 2C, the gaming system removes symbols 225*a*, 225*g*, 225*l*, 225*i*, and 225*e*, which form the Seven-Seven-Seven-Seven-Seven winning symbol combination along payline 215*d*, from their respective symbol display areas 220*a*, 220*g*, 220*l*, 220*i*, and 220*e*. Additionally, the gaming system removes symbols 325*a*, 325*g*, 325*l*, 325*i*, and 325*e* from their respective symbol display areas 320*a*, 320*g*, 320*l*, 320*i*, and 320*e*, which correspond to symbol display areas 220*a*, 220*g*, 220*l*, 220*i*, and 220*e*. It should be appreciated that the removal of these symbols causes symbol display areas 220*a*, 220*g*, 220*l*, 220*i*, 220*e*, 325*a*, 325*g*, 325*l*, 325*i*, and 325*e* to become empty symbol display areas.

The gaming system determines whether any of the displayed symbols have a designated spatial relationship with any empty symbol display areas. In this example, a displayed symbol has a designated spatial relationship with an empty symbol display area if that displayed symbol is located above that empty symbol display area. In this example, for each displayed symbol having the designated spatial relationship with one or more empty symbol display areas, the gaming system repositions or shifts that displayed symbol downward to fill one of those empty symbol display areas. In this illustrated example, a plurality of the displayed symbols have the designated spatial relationship with (i.e., are displayed above) one or more empty symbol display areas. The gaming system displays the following message in message box 260: "PLEASE WAIT WHILE THE REMAINING SYMBOLS TUMBLE DOWNWARD TO FILL THE EMPTY SYMBOL DISPLAY AREAS . . . ."

Figure 2D:
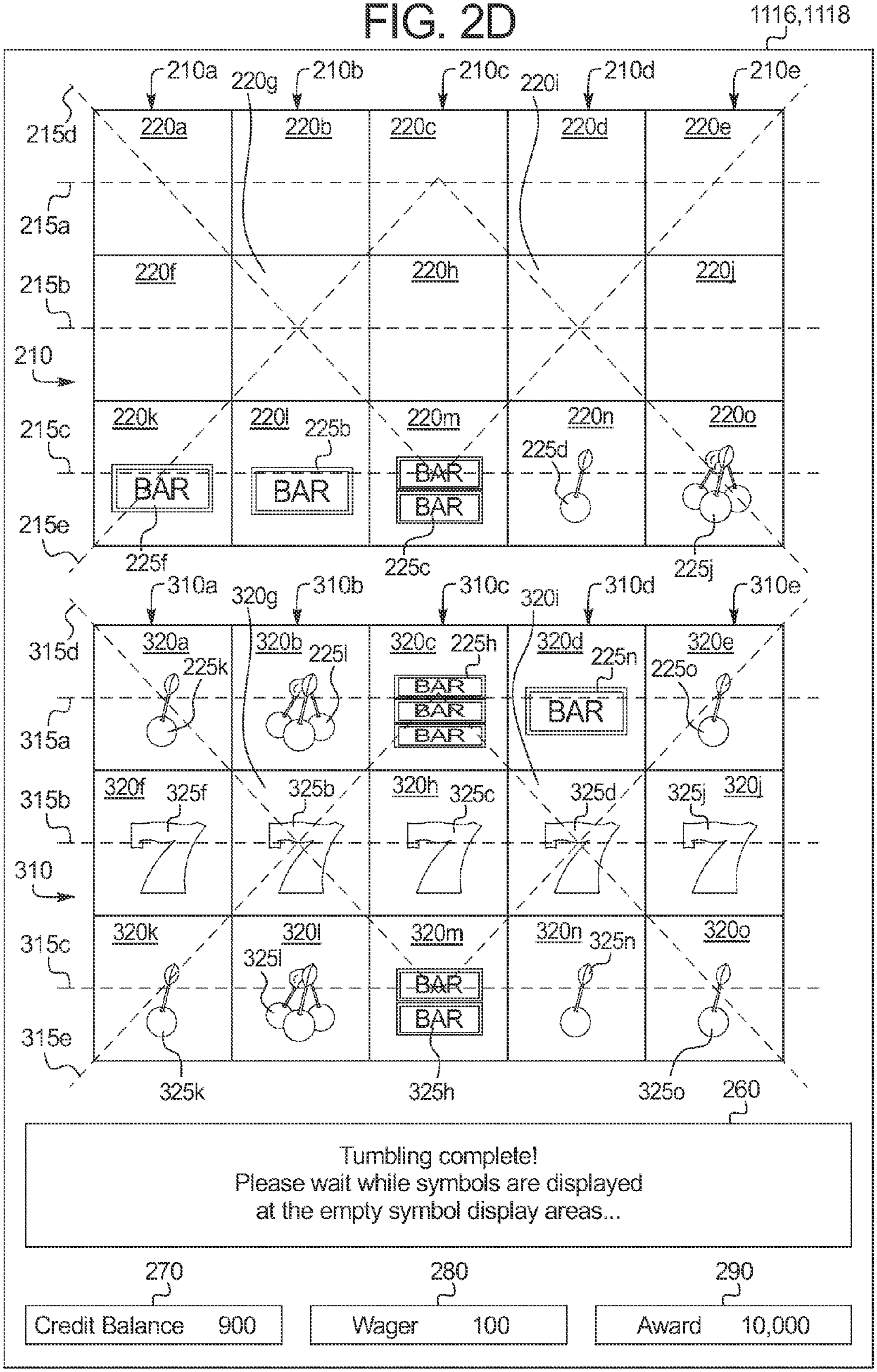

As illustrated in FIG. 2D, if possible, the gaming system repositions or shifts the displayed symbols downward as far as possible to fill certain empty symbol display areas without changing the relative order of those symbols. Here, the gaming system repositions: Cherry symbol 225*k* downward such that it is displayed at symbol display area 320*a*, Bar symbol 225*f* downward such that it is displayed at symbol display area 220*k*, Seven symbol 325*b* downward such that it is displayed at symbol display area 320*g*, Triple Cherry symbol 225*l* downward such that it is displayed at symbol display area 320*b*, Bar symbol 225*b* downward such that it is displayed at symbol display area 220*l*, Double Bar symbol 325*h* downward such that it is displayed at symbol display area 320*m*, Seven symbol 325*c* downward such that it is displayed at symbol display area 320*h*, Triple Bar symbol 225*h* downward such that it is displayed at symbol display area 320*c*, Double Bar symbol 225*c* downward such that it is displayed at symbol display area 220*m*, Seven symbol 325*d* downward such that it is displayed at symbol display area 320*i*, Bar symbol 225*n* downward such that it is displayed at symbol display area 320*d*, Cherry symbol 225*d* downward such that it is displayed at symbol display area 220*n*, Cherry symbol 225*o* downward such that it is displayed at symbol display area 320*e*, and Triple Cherry symbol 225*j* downward such that it is displayed at symbol display area 220*o*.

It should be appreciated that the repositioning of these displayed symbols causes symbol display areas 220*a*, 220*b*, 220*c*, 220*d*, 220*e*, 220*f*, 220*g*, 220*h*, 220*i*, and 220*j* to become empty symbol display areas. In this example, after repositioning any displayed symbols, for each remaining empty symbol display area (i.e., for each empty symbol display area not filled by any repositioning of the displayed symbols and for each empty symbol display area created by any repositioning of the displayed symbols), the gaming system generates and displays one of the symbols at that empty symbol display area. The gaming system displays the following message in message box 260: "TUMBLING COMPLETE! PLEASE WAIT WHILE SYMBOLS ARE DISPLAYED AT THE EMPTY SYMBOL DISPLAY AREAS . . . ."

Figure 2E:
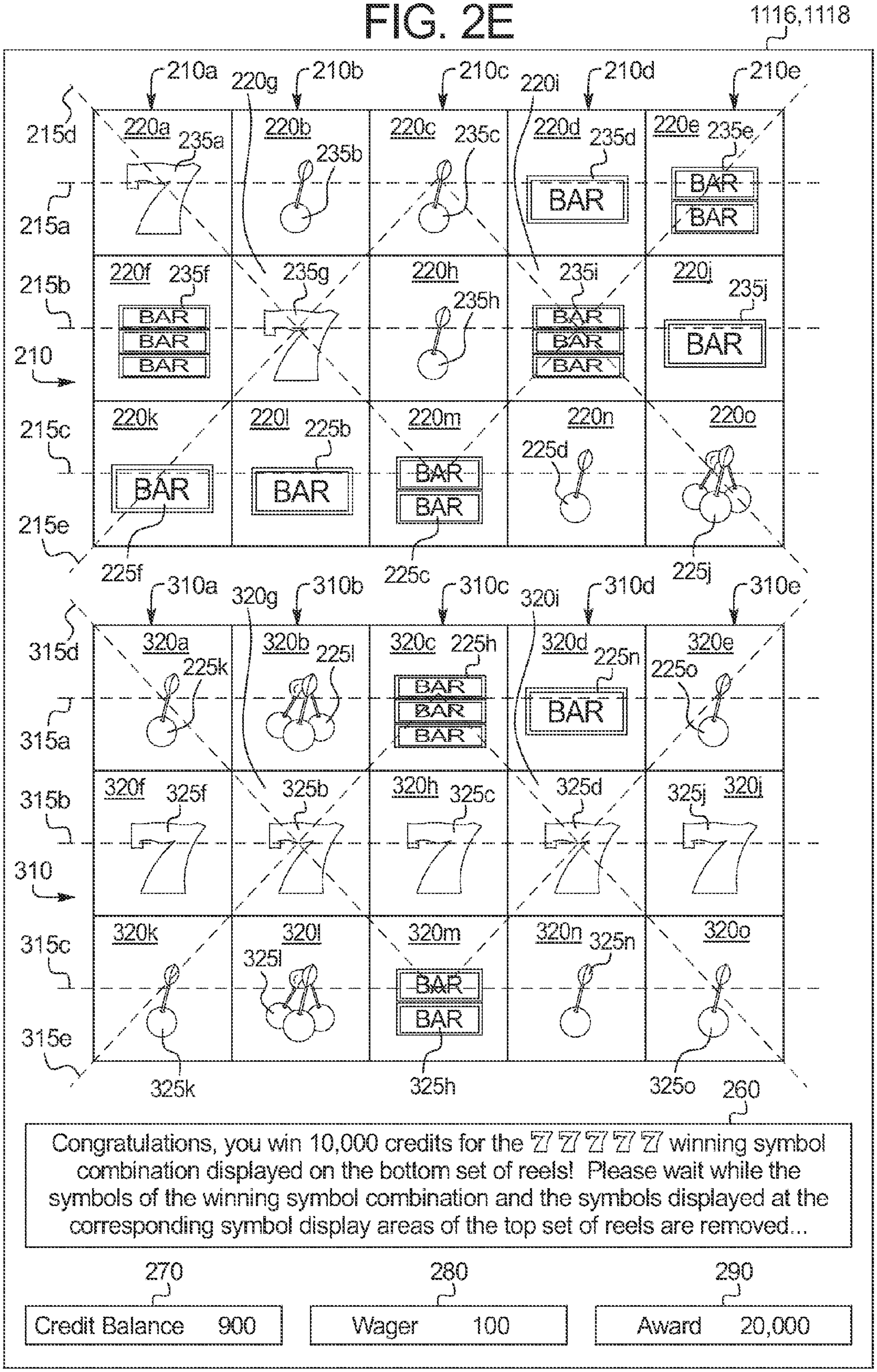

As illustrated in FIG. 2E, for each empty symbol display area, the gaming system generates and displays one of the symbols at that empty symbol display area. More specifically, the gaming system generates and displays: Seven symbol 235*a* at symbol display area 220*a*, Cherry symbol 235*b* at symbol display area 220*b*, Cherry symbol 235*c* at symbol display area 220*c*, Bar symbol 235*d* at symbol display area 220*d*, Double Bar symbol 235*e* at symbol display area 220*e*, Triple Bar symbol 235*f* at symbol display area 220*f*, Seven symbol 235*g* at symbol display area 220*g*, Cherry symbol 235*h* at symbol display area 220*h*, Triple Bar symbol 235*i* at symbol display area 220*i*, and Bar symbol 235*j* at symbol display area 220*j*.

The gaming system makes another independent award determination for each of the sets of reels. In this example, the gaming system determines whether the symbols displayed at the first set of symbol display areas 200 form any of the winning symbol combinations along paylines 215*a*, 215*b*, 215*c*, 215*d*, and/or 215*e*. Here, the gaming system determines that none of the winning symbol combinations are formed by the symbols displayed at the first set of symbol display areas 200. Additionally, the gaming system determines whether the symbols displayed at the second set of symbol display areas 300 form any of the winning symbol combinations along paylines 315*a*, 315*b*, 315*c*, 315*d*, and/or 315*e*. Here, the gaming system determines an award of 10,000 credits associated with the Seven-Seven-Seven-Seven-Seven winning symbol combination displayed along payline 315*b*. The gaming system updates award meter 290 to reflect the 10,000 credit award.

Since at least one winning symbol combination is formed by the symbols displayed at at least one of the sets of symbol display areas, the gaming system provides another cascading symbols feature. The gaming system displays the following message in message box 260: "CONGRATULATIONS, YOU WIN 10,000 CREDITS FOR THE 7 7 7 7 7 WINNING SYMBOL COMBINATION DISPLAYED ON THE BOTTOM SET OF REELS! PLEASE WAIT WHILE THE SYMBOLS OF THE WINNING SYMBOL COMBINATION AND THE SYMBOLS DISPLAYED AT THE CORRESPONDING SYMBOL DISPLAY AREAS OF THE TOP SET OF REELS ARE REMOVED . . . ."

Figure 2F:
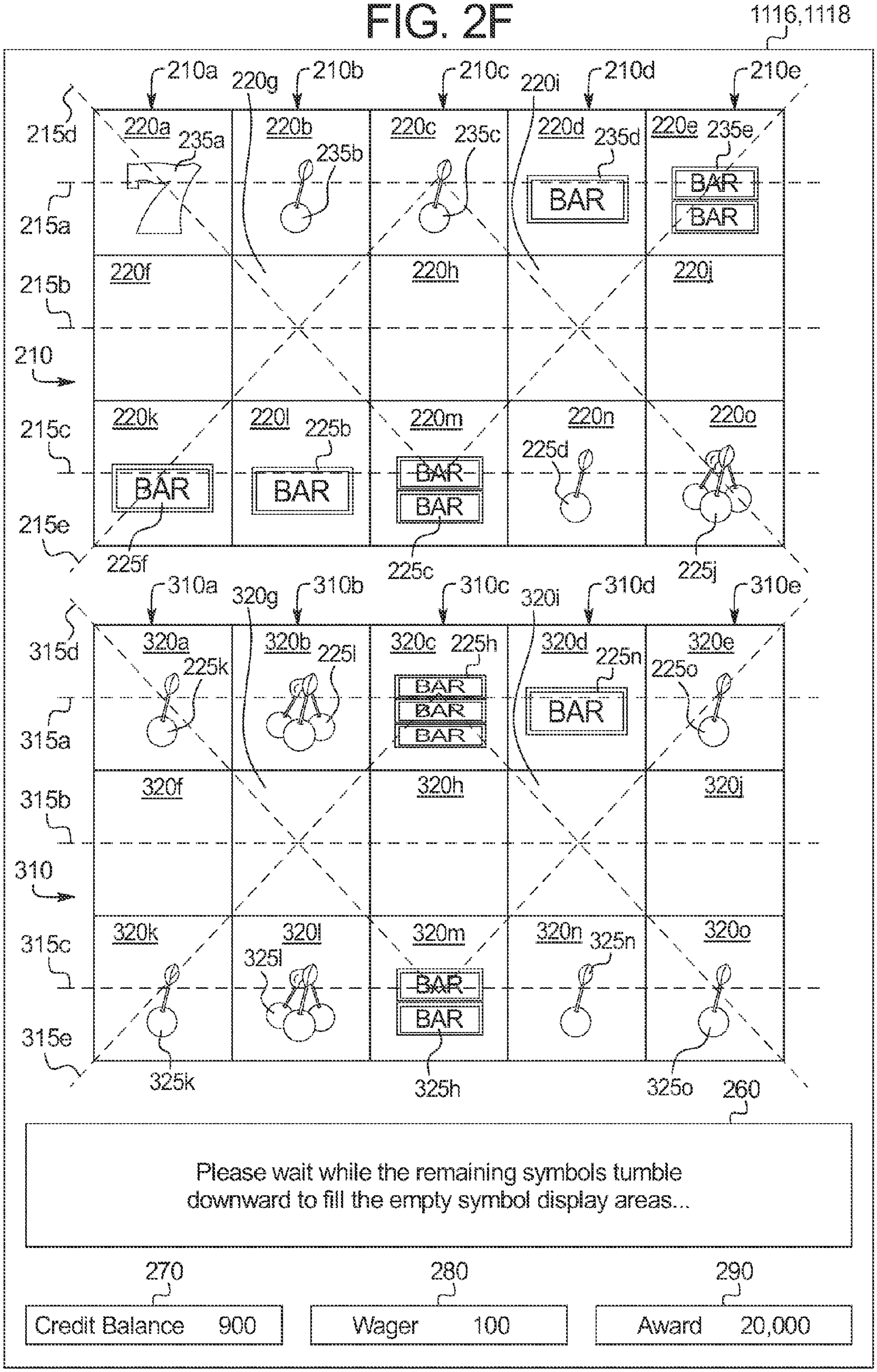

As illustrated in FIG. 2F, the gaming system removes symbols 325*f*, 325*b*, 325*c*, 325*d*, and 325*j*, which form the Seven-Seven-Seven-Seven-Seven winning symbol combination along payline 315*b*, from their respective symbol display areas 320*f*, 320*g*, 320*h*, 320*i*, and 320*j*. Additionally, the gaming system removes symbols 235*f*, 235*g*, 235*h*, 235*i*, and 235*j* from their respective symbol display areas 220*f*, 220*g*, 220*h*, 220*i*, and 220*j*, which correspond to symbol display areas 320*f*, 320*g*, 320*h*, 320*i*, and 320*j*. It should be appreciated that the removal of these symbols causes symbol display areas 320*f*, 320*g*, 320*h*, 320*i*, 320*j*, 220*f*, 220*g*, 220*h*, 220*i*, and 220*j* to become empty symbol display areas. The gaming system determines that a plurality of the displayed symbols have the designated spatial relationship with (i.e., are displayed above) one or more empty symbol display areas. The gaming system displays the following message in message box 260: "PLEASE WAIT WHILE THE REMAINING SYMBOLS TUMBLE DOWNWARD TO FILL THE EMPTY SYMBOL DISPLAY AREAS . . . ."

Figure 2G:
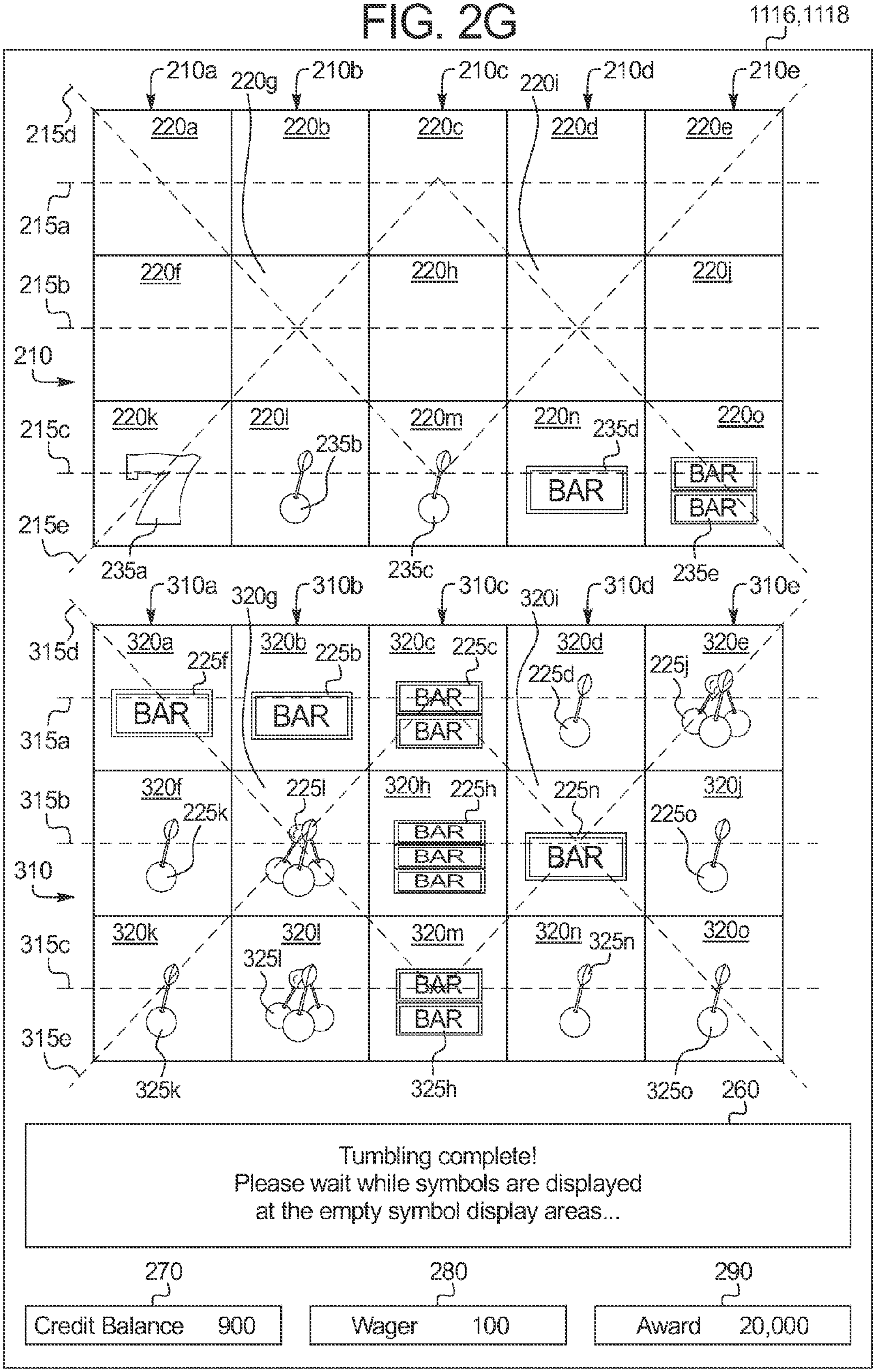

As illustrated in FIG. 2G, if possible, the gaming system repositions or shifts the displayed symbols downward as far as possible to fill certain empty symbol display areas without changing the relative order of those symbols. More specifically, the gaming system repositions: Cherry symbol 225*k* downward such that it is displayed at symbol display area 320*f*, Bar symbol 225*f* downward such that it is displayed at symbol display area 320*a*, Seven symbol 235*a* downward such that it is displayed at symbol display area 220*k*, Triple Cherry symbol 225*l* downward such that it is displayed at symbol display area 320*g*, Bar symbol 225*b* downward such that it is displayed at symbol display area 320*c*, Cherry symbol 235*b* downward such that it is displayed at symbol display area 220*l*, Triple Bar symbol 225*h* downward such that it is displayed at symbol display area 320*h*, Double Bar symbol 225*c* downward such that it is displayed at symbol display area 320*c*, Cherry symbol 235*c* downward such that it is displayed at symbol display area 220*m*, Bar symbol 225*n* downward such that it is displayed at symbol display area 320*i*, Cherry symbol 225*d* downward such that it is displayed at symbol display area 320*d*, Bar symbol 235*d* downward such that it is displayed at symbol display area 220*n*, Cherry symbol 225*o* downward such that it is displayed at symbol display area 320*j*, Triple Cherry symbol 225*j* downward such that it is displayed at symbol display area 320*e*, and Double Bar symbol 235*e* downward such that it is displayed at symbol display area 220*o*.

It should be appreciated that the repositioning of these displayed symbols causes symbol display areas 220*a*, 220*b*, 220*c*, 220*d*, 220*e*, 220*f*, 220*g*, 220*h*, 220*i*, and 220*j* to become empty symbol display areas. The gaming system displays the following message in message box 260: "TUMBLING COMPLETE! PLEASE WAIT WHILE SYMBOLS ARE DISPLAYED AT THE EMPTY SYMBOL DISPLAY AREAS . . . "

Figure 2H:
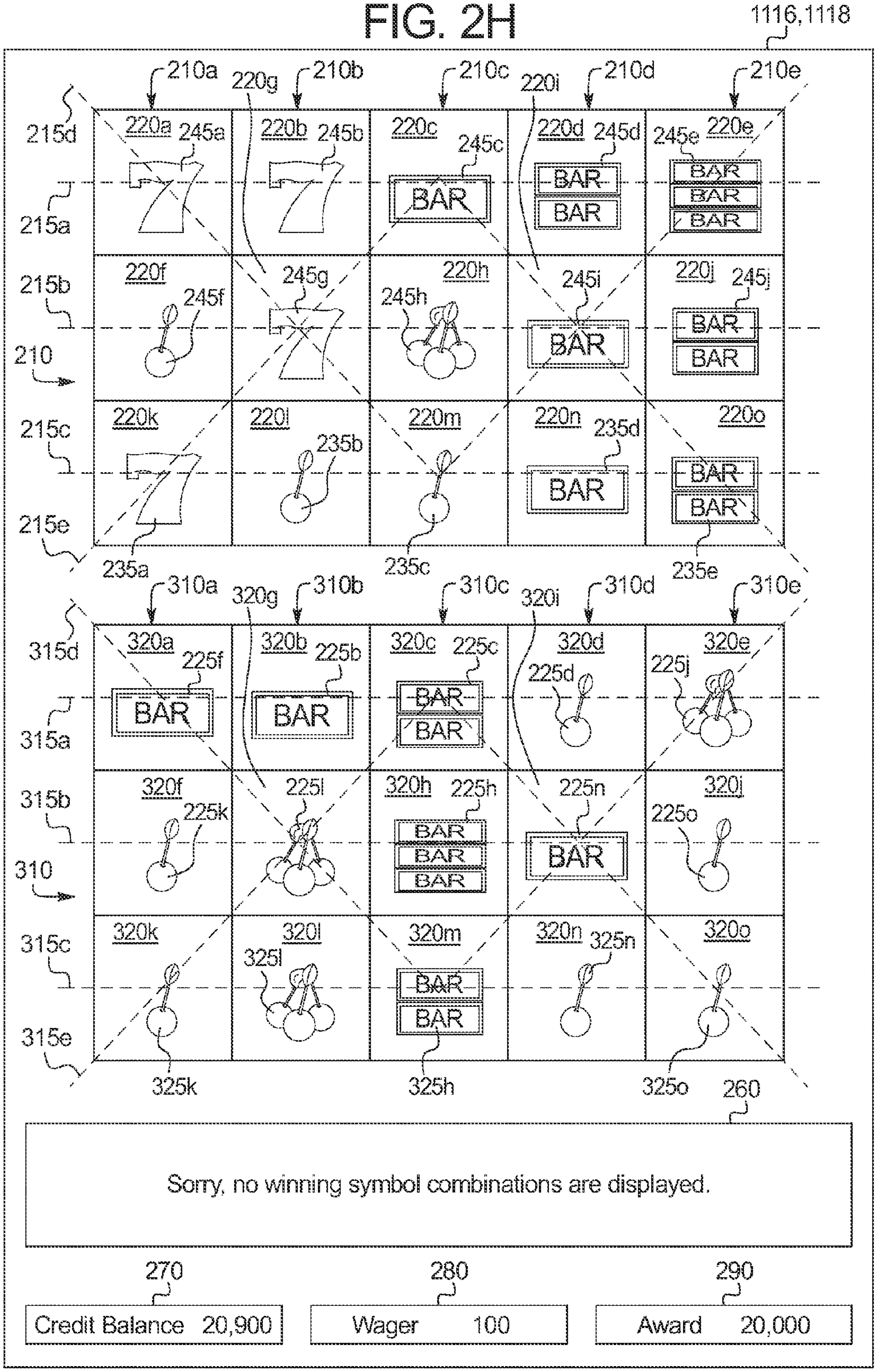

As illustrated in FIG. 2H, after repositioning the displayed symbols, for each remaining empty symbol display area, the gaming system generates and displays one of the symbols at that empty symbol display area. More specifically, the gaming system generates and displays: Seven symbol 245*a* at symbol display area 220*a*, Seven symbol 245*b* at symbol display area 220*b*, Bar symbol 245*c* at symbol display area 220*c*, Double Bar symbol 245*d* at symbol display area 220*d*, Triple Bar symbol 245*e* at symbol display area 220*e*, Cherry symbol 245*f* at symbol display area 220*f*, Seven symbol 245*g* at symbol display area 220*g*, Triple Cherry symbol 245*h* at symbol display area 220*h*, Bar symbol 245*i* at symbol display area 220*i*, and Double Bar symbol 245*j* at symbol display area 220*j*.

The gaming system makes another independent award determination for each of the sets of reels. The gaming system determines whether the symbols displayed at the first set of symbol display areas 200 form any of the winning symbol combinations along paylines 215*a*, 215*b*, 215*c*, 215*d*, and/or 215*e*. Here, the gaming system determines that none of the winning symbol combinations are formed by the symbols displayed at the first set of symbol display areas 200. Additionally, the gaming system determines whether the symbols displayed at the second set of symbol display areas 300 form any of the winning symbol combinations along paylines 315*a*, 315*b*, 315*c*, 315*d*, and/or 315*e*. Here, the gaming system determines that none of the winning symbol combinations are formed by the symbols displayed at the second set of symbol display areas 300. Since none of the winning symbol combinations are formed by the symbols displayed at any of the sets of symbol display areas, the gaming system ends the play of the multiplay slot game. The gaming system displays the following message in message box 260: "SORRY, NO WINNING SYMBOL COMBINATIONS ARE DISPLAYED."

In the example described above in association with FIGS. 2A to 2H, when a designated symbol combination is formed by the symbols displayed at the first set of symbol display areas, the gaming system removes the symbols forming the designated symbol combination from the symbol display areas of the first set at which those symbols are displayed. In other embodiments, however, when a designated symbol combination is formed by the symbols displayed at the first set of symbol display areas, the gaming system does not remove the symbols forming the designated symbol combination from the symbol display areas of the first set at which those symbols are displayed. That is, in these embodiments, the formation of designated symbol combinations at the first set of symbol display areas causes symbols to be removed from corresponding symbol display areas of the second set of symbol display areas, but does not cause any symbols to be removed from the symbol display areas of the first set. Similarly, in the example described above in association with FIGS. 2A to 2H, when a designated symbol combination is formed by the symbols displayed at the second set of symbol display areas, the gaming system removes the symbols forming the designated symbol combination from the symbol display areas of the second set at which those symbols are displayed. In other embodiments, however, when a designated symbol combination is formed by the symbols displayed at the second set of symbol display areas, the gaming system does not remove the symbols forming the designated symbol combination from the symbol display areas of the second set at which those symbols are displayed. That is, in these embodiments, the formation of designated symbol combinations at the second set of symbol display areas causes symbols to be removed from corresponding symbol display areas of the first set of symbol display areas, but does not cause any symbols to be removed from the symbol display areas of the first set.

Although the example described above in association with FIGS. 2A to 2H enables symbols displayed at the first (i.e., top) set of symbol display areas to be repositioned downward to fill empty symbol display areas of the second (i.e., bottom) set of symbol display areas, it should be appreciated that the present disclosure contemplates each set of symbol display areas may cascade independently of one another.

In certain embodiments, the gaming system does not reposition any of the displayed symbols after removing any displayed symbols to create empty symbol display areas. Rather, in these embodiments, after removing any displayed symbols to create empty symbol display areas, for each created empty symbol display area, the gaming system generates and displays one of the symbols in that symbol display area and makes another award determination. Process 100 without including diamond 124 and without including block 126 is one example of such an embodiment.

In another embodiment, the gaming system does not reposition a displayed symbol if that displayed symbol has a designated spatial relationship with a designated symbol display area. For instance, in one example, if a symbol is removed from a designated symbol display area, the gaming system generates and displays a Wild symbol at that designated symbol display area rather than repositioning any displayed symbols into the designated symbol display area to fill the designated symbol display area.

In various embodiments, for a single play of the multiplay slot game, the gaming system may provide the cascading symbols feature up to a maximum quantity of times. In one such embodiment, the gaming system provides the cascading symbols feature a maximum of one time. In other embodiments, for a single play of the multiplay slot game, there is no limit to how many times the gaming system may provide the cascading symbols feature. In other embodiments, the quantity of cascades can affect other game elements or attributes, such as a global award modifier (such as a multiplier that increases each time the cascading symbols feature is provided for a single play), a bonus triggering event (that occurs upon the occurrence of a designated quantity of cascades provided for a single play), a designated special award (that is provided upon the occurrence of a designated quantity of cascades provided for a single play), and the like.

In other embodiments, when the symbols displayed at one or more of the symbol display areas of the first set form a designated symbol combination: (a) the gaming system removes the symbols forming the designated symbol combination from the symbol display areas of the first set at which those symbols are displayed; and (b) if the symbols displayed at the symbol display areas of the second set do not form a designated symbol combination, for each symbol display area of the second set that corresponds to one of the symbol display areas of the first set from which a symbol of the formed designated symbol combination was removed, the gaming system removes the symbol displayed at that symbol display area. In some variations of such embodiments, when the symbols displayed at one or more of the symbol display areas of the second set form a designated symbol combination: (a) the gaming system removes the symbols forming the designated symbol combination from the symbol display areas of the second set at which those symbols are displayed; and (b) if the symbols displayed at the symbol display areas of the first set do not form a designated symbol combination, for each symbol display area of the first set that corresponds to one of the symbol display areas of the second set from which a symbol of the formed designated symbol combination was removed, the gaming system removes the symbol displayed at that symbol display area.

In certain embodiments, such as the example described above with respect to FIGS. 2A to 2H, corresponding symbol display areas have two-way correspondence. For instance, in an example in which symbol display areas A and AA have two-way correspondence, symbol display area A corresponds to symbol display area AA and symbol display area AA corresponds to symbol display area A. In this example, if a symbol of a formed designated symbol combination is displayed at symbol display area A, the gaming system removes that symbol from symbol display area A and removes the symbol displayed at corresponding symbol display area AA. Similarly, in this example, if a symbol of a formed designated symbol combination is displayed at symbol display area AA, the gaming system removes that symbol from symbol display area AA and removes the symbol displayed at corresponding symbol display area A. In another example in which symbol display areas A and AA have two-way correspondence, symbol display area A corresponds to symbol display area AA and symbol display area AA corresponds to symbol display area A. In this example, if a symbol of a formed designated symbol combination is displayed at symbol display area A, the gaming system removes the symbol displayed at corresponding symbol display area AA without removing the symbol displayed at symbol display area A. Similarly, in this example, if a symbol of a formed designated symbol combination is displayed at symbol display area AA, the gaming system removes the symbol displayed at corresponding symbol display area A without removing the symbol displayed at symbol display area AA.

In other embodiments, however, one-way correspondence between symbol display areas exists. For instance, in one example, symbol display area A corresponds to symbol display area AA, but symbol display area AA does not correspond to symbol display area A. In this example, if a symbol of a formed designated symbol combination is displayed at symbol display area A, the gaming system removes that symbol from symbol display area A and removes the symbol displayed at corresponding symbol display area AA. However, if a symbol of a formed designated symbol combination is displayed at symbol display area AA, the gaming system removes that symbol from symbol display area AA and does not remove the symbol displayed at symbol display area A because symbol display area AA does not correspond to symbol display area A. In another example, symbol display area A corresponds to symbol display area AA, but symbol display area AA does not correspond to symbol display area A. In this example, if a symbol of a formed designated symbol combination is displayed at symbol display area A, the gaming system removes the symbol displayed at corresponding symbol display area AA without removing the symbol displayed at symbol display area A. However, if a symbol of a formed designated symbol combination is displayed at symbol display area AA, the gaming system does not remove the symbol displayed at symbol display area A because symbol display area AA does not correspond to symbol display area A.

In various embodiments, when a designated symbol combination is formed by the symbols displayed at one of the sets of symbol display areas, the gaming system: (a) removes the symbols forming the designated symbol combination from the symbol display areas at which those symbols are displayed, and (b) removes other instances of those symbols displayed at symbol display areas of any of the other sets of symbol display areas. For instance, in a multiplay slot game including two sets of reels and associated sets of symbol display areas, if a Cherry-Cherry-Cherry designated symbol combination is formed by the symbols displayed at a first set of symbol display areas, the gaming system: (a) removes the three Cherry symbols forming the designated symbol combination from the symbol display areas at which they are displayed, and (b) removes any other instances of the Cherry symbol displayed at any of the symbol display areas of the second set.

In other embodiments, when a designated symbol combination is formed by the symbols displayed at one of the sets of symbol display areas, for at least one of the symbols of that designated symbol combination, the gaming system removes other instances of those symbols displayed at symbol display areas of any of the other sets of symbol display areas. For instance, in a multiplay slot game including two sets of reels and associated sets of symbol display areas, if a Cherry-Cherry-Cherry designated symbol combination is formed by the symbols displayed at a first set of symbol display areas, the gaming system removes any instances of the Cherry symbol displayed at any of the symbol display areas of the second set without removing the instances of the symbols forming the designated symbol combination from the first set.

In one variation, rather than removing other instances of the symbols of the formed designated symbol combination, the gaming system removes any symbols of a set or sets of symbols to which the symbols of the designated symbol combination belong. For instance, a set of symbols includes Bar, Double Bar, and Triple Bar symbols. In this example, for a play of a multiplay slot game including two sets of reels and associated sets of symbol display areas, if a Bar-Bar-Bar designated symbol combination is formed by the symbols displayed at a first set of symbol display areas, the gaming system: (a) removes the three Bar symbols forming the designated symbol combination from the symbol display areas at which they are displayed; and (b) removes any Bar, Double Bar, and Triple Bar symbols displayed at any of the symbol display areas of the second set. In another example, a set of symbols includes Bar, Double Bar, and Triple Bar symbols. In this example, for a play of a multiplay slot game including two sets of reels and associated sets of symbol display areas, if a Bar-Bar-Bar designated symbol combination is formed by the symbols displayed at a first set of symbol display areas, the gaming system removes any Bar, Double Bar, and Triple Bar symbols displayed at any of the symbol display areas of the second set without removing the instances of the symbols forming the designated symbol combination from the first set.

In another variation, when the symbols displayed on a plurality of a first set of reels at a first set of symbol display areas form a designated symbol combination, the gaming system: (a) removes the symbols forming the designated symbol combination from the symbol display areas of the first set at which those symbols are displayed, and (b) removes other instances of those symbols displayed at symbol display areas associated with reels of other sets of reels that correspond to the reels of the first set on which the symbols forming the designated symbol combination are displayed. For instance, in a multiplay slot game including two sets of five adjacent reels and associated sets of symbol display areas, if a Cherry-Cherry-Cherry designated symbol combination is formed by the symbols displayed on Reels 1, 2, and 3 of the first set of reels at a first set of symbol display areas, the gaming system: (a) removes the three Cherry symbols forming the designated symbol combination from the symbol display areas of the first set at which they are displayed; and (b) removes any other Cherry symbols displayed at the symbol display areas of the second set that are associated with corresponding Reels 1, 2, and 3 of the second set of reels. In this example, the gaming system does not remove any Cherry symbols from the symbol display areas of the second set associated with Reels 4 and 5 of the second set of reels.

In other embodiments, when the symbols displayed on a plurality of a first set of reels at a first set of symbol display areas form a designated symbol combination, the gaming system removes other instances of those symbols displayed at symbol display areas associated with reels of other sets of reels that correspond to the reels of the first set on which the symbols forming the designated symbol combination are displayed. For instance, in a multiplay slot game including two sets of five adjacent reels and associated sets of symbol display areas, if a Cherry-Cherry-Cherry designated symbol combination is formed by the symbols displayed on Reels 1, 2, and 3 of the first set of reels at a first set of symbol display areas, the gaming system removes any other Cherry symbols displayed at the symbol display areas of the second set that are associated with corresponding Reels 1, 2, and 3 of the second set of reels without removing the instances of the symbols forming the designated symbol combination from the first set. In this example, the gaming system also does not remove any Cherry symbols from the symbol display areas of the second set associated with Reels 4 and 5 of the second set of reels.

In certain embodiments, when a designated symbol combination is formed by the symbols displayed at the first set of symbol display areas, the gaming system: (a) removes the symbols forming the designated symbol combination from the symbol display areas of the first set at which those symbols are displayed, and (b) removes the symbols displayed at the symbol display areas of the second set that form a mirror image of the pattern of the symbol display areas of the first set from which the symbols of the formed designated symbol combination were removed. In other words, in these embodiments, the symbol display areas of the first set correspond to It should be appreciated that the mirror image may be taken along any suitable plane through the symbol display areas. For instance, in a multiplay slot game in which the first and second sets of symbol display areas are 3×3 matrices, if a designated symbol combination is formed by the symbols displayed at the upper left, middle, and bottom right symbol display areas of the first set, the gaming system: (a) removes the symbols displayed at those symbol display areas; and (b) removes the symbols displayed at the bottom left, middle, and top right symbol display areas of the second set, which mirror pattern formed by the symbol display areas of the first set from which the symbols of the designated symbol combination were removed.

In other embodiments, when a designated symbol combination is formed by the symbols displayed at the first set of symbol display areas, the gaming system removes the symbols displayed at the symbol display areas of the second set that form a mirror image of the pattern of the symbol display areas of the first set that display the symbols of the designated symbol combination. It should be appreciated that the mirror image may be taken along any suitable plane through the symbol display areas. For instance, in a multiplay slot game in which the first and second sets of symbol display areas are 3×3 matrices, if a designated symbol combination is formed by the symbols displayed at the upper left, middle, and bottom right symbol display areas of the first set, the gaming system removes the symbols displayed at the bottom left, middle, and top right symbol display areas of the second set, which mirror pattern formed by the symbol display areas of the first set from which the symbols of the designated symbol combination were removed, without removing the symbols forming the designated symbol combination from the symbol display areas of the first set.

In various embodiments, when a designated symbol combination is formed by the symbols displayed at the first set of symbol display areas, the gaming system: (a) for each of the symbols of that formed designated symbol combination, removes that symbol from the symbol display area at which that symbol is displayed; and (b) for each symbol display area of the second set that corresponds to a symbol display area of the first set from which one of one or more designated symbols was removed, removes the symbol displayed at that symbol display area. In one example, the Triple Bar symbol is the only designated symbol. In this example, the symbols displayed at the first set of symbol display areas form a Bar-Double Bar-Triple Bar designated symbol combination. Accordingly, the gaming system: (a) removes the Bar, Double Bar, and Triple Bar symbols of the formed designated symbol combination from the symbol display areas at which those symbols are displayed; and (b) removes the symbol displayed at the symbol display area of the second set that corresponds to the symbol display area of the first set from which the Triple Bar symbol was removed. In this example, since the Bar and Double Bar symbols are not designated symbols, the gaming system does not remove the symbols displayed at the symbol display areas of the second set that correspond to the symbol display areas of the first set from which the Bar and Double Bar symbols were removed.

In other embodiments, when a designated symbol combination is formed by the symbols displayed at the first set of symbol display areas, for each symbol display area of the second set that corresponds to a symbol display area of the first set that displays a designated symbol, removes the symbol displayed at that symbol display area. In one example, the Triple Bar symbol is the only designated symbol. In this example, the symbols displayed at the first set of symbol display areas form a Bar-Double Bar-Triple Bar designated symbol combination. Accordingly, the gaming system removes the symbol displayed at the symbol display area of the second set that corresponds to the symbol display area of the first set from which the Triple Bar symbol was removed without removing any of the symbols forming the designated symbol combination from the symbol display areas of the first set. In this example, since the Bar and Double Bar symbols are not designated symbols, the gaming system does not remove the symbols displayed at the symbol display areas of the second set that correspond to the symbol display areas of the first set from which the Bar and Double Bar symbols were removed.

In further embodiments, when a designated symbol combination is formed by the symbols displayed at the first set of symbol display areas, the gaming system: (a) for each of the symbols of that formed designated symbol combination, removes that symbol from the symbol display area at which that symbol is displayed; and (b) for each symbol display area of the second set that corresponds to a symbol display area of the first set from which one of one or more non-designated symbols was removed, removes the symbol displayed at that symbol display area (unless, in certain embodiments, that symbol is a non-removable symbol). In one example, the Bonus and Wild symbols are designated symbols, and all other symbols are non-designated symbols. In this example, the symbols displayed at the first set of symbol display areas form a Bar-Double Bar-Triple Bar designated symbol combination. Accordingly, the gaming system: (a) removes the Bar, Double Bar, and Triple Bar symbols of the formed designated symbol combination from the symbol display areas at which those symbols are displayed; (b) removes a Cherry symbol (i.e., a non-designated symbol) displayed at the symbol display area of the second set that corresponds to the symbol display area of the first set from which the Bar symbol was removed; (c) removes a Cherry symbol (i.e., a non-designated symbol) displayed at the symbol display area of the second set that corresponds to the symbol display area of the first set from which the Double Bar symbol was removed; and (d) does not remove a Wild symbol (i.e., a designated symbol) displayed at the symbol display area of the second set that corresponds to the symbol display area of the first set from which the Triple Bar symbol was removed.

In other embodiments, when a designated symbol combination is formed by the symbols displayed at the first set of symbol display areas, for each symbol display area of the second set that corresponds to a symbol display area of the first set displaying a non-designated symbol, the gaming system removes the symbol displayed at that symbol display area (unless, in certain embodiments, that symbol is a non-removable symbol). In one example, the Bonus and Wild symbols are designated symbols, and all other symbols are non-designated symbols. In this example, the symbols displayed at the first set of symbol display areas form a Bar-Double Bar-Triple Bar designated symbol combination. Accordingly, the gaming system (a) removes a Cherry symbol (i.e., a non-designated symbol) displayed at the symbol display area of the second set that corresponds to the symbol display area of the first set at which the Bar symbol is displayed; (b) removes a Cherry symbol (i.e., a non-designated symbol) displayed at the symbol display area of the second set that corresponds to the symbol display area of the first set at which the Double Bar symbol is displayed; and (c) does not remove a Wild symbol (i.e., a designated symbol) displayed at the symbol display area of the second set that corresponds to the symbol display area of the first set at which the Triple Bar symbol is displayed.

In various embodiments, the gaming system removes symbols according to a sequence or order. For example, one multiplay slot game includes four sets of reels and associated sets of symbol display areas. In this example, the gaming system: (1) removes the symbols of any designated symbol combinations formed by the symbols displayed at the first set of symbol display areas from the symbol display areas at which those symbols are displayed; (2) removes: (a) the symbols of any designated symbol combinations formed by the symbols displayed at the second set of symbol display areas from the symbol display areas at which those symbols are displayed, and (b) the symbols displayed at any symbol display areas of the second set corresponding to the symbol display areas of the first set from which a symbol was removed; (3) removes: (a) the symbols of any designated symbol combinations formed by the symbols displayed at the third set of symbol display areas from the symbol display areas at which those symbols are displayed, (b) the symbols displayed at any symbol display areas of the third set corresponding to the symbol display areas of the first set from which a symbol was removed, and (c) the symbols displayed at any symbol display areas of the third set corresponding to the symbol display areas of the second set from which a symbol was removed; and (4) removes: (a) the symbols of any designated symbol combinations formed by the symbols displayed at the fourth set of symbol display areas from the symbol display areas at which those symbols are displayed, (b) the symbols displayed at any symbol display areas of the fourth set corresponding to the symbol display areas of the first set from which a symbol was removed, (c) the symbols displayed at any symbol display areas of the fourth set corresponding to the symbol display areas of the second set from which a symbol was removed, and (d) the symbols displayed at any symbol display areas of the fourth set corresponding to the symbol display areas of the third set from which a symbol was removed.

In another example, one multiplay slot game includes four sets of reels and associated sets of symbol display areas. In this example, the gaming system: (1) removes the symbols displayed at any symbol display areas of the second set corresponding to the symbol display areas of the first set displaying a symbol of a formed designated symbol combination; (2) removes: (a) the symbols displayed at any symbol display areas of the third set corresponding to the symbol display areas of the first set displaying a symbol of a formed designated symbol combination, and (b) the symbols displayed at any symbol display areas of the third set corresponding to the symbol display areas of the second set displaying a symbol of a formed designated symbol combination; and (3) removes: (a) the symbols displayed at any symbol display areas of the fourth set corresponding to the symbol display areas of the first set displaying a symbol of a formed designated symbol combination, (b) the symbols displayed at any symbol display areas of the fourth set corresponding to the symbol display areas of the second set displaying a symbol of a formed designated symbol combination, and (c) the symbols displayed at any symbol display areas of the fourth set corresponding to the symbol display areas of the third set displaying a symbol of a formed designated symbol combination.

It should be appreciated that any suitable sequence or order may be employed. In the example described above, the gaming system removes symbols according to the following sequence: first set of symbol display areas, second set of symbol display areas, third set of symbol display areas, fourth set of symbol display areas. In another example, the gaming system removes symbols according to the following order: fourth set of symbol display areas, third set of symbol display areas, second set of symbol display areas, first set of symbol display areas. In another embodiment, the gaming system removes symbols according to a plurality of simultaneous (or sequential) sequences. In one example, the gaming system removes symbols according to the following two sequences, performed simultaneously: (1) first set of symbol display areas, second set of symbol display areas; and (2) third set of symbol display areas, fourth set of symbol display areas.

In certain embodiments, when a designated symbol combination is formed by the symbols displayed at the first set of symbol display areas, the gaming system: (a) for each of the symbols of that formed designated symbol combination, removes that symbol from the symbol display area at which that symbol is displayed; (b) for each symbol display area of the second set that corresponds to a symbol display area of the first set from which one the symbols was removed, remove the symbol displayed at that symbol display area; and (c) transforms at least one symbol displayed at one of the symbol display areas of the second set into a designated symbol. In one example, when a designated symbol combination is formed by the symbols displayed at the first set of symbol display areas, the gaming system modifies any instances of those same symbols displayed at the second set of symbol display areas into a Wild symbol (i.e., the designated symbol in this embodiment), and removes the symbols from the first and second sets as described above.

In other embodiments, when a designated symbol combination is formed by the symbols displayed at the first set of symbol display areas, for each symbol display area of the second set that corresponds to a symbol display area of the first set at which one of the symbols of that designated symbol combination is displayed, the gaming system removes the symbol displayed at that symbol display area and transforms at least one symbol displayed at one of the symbol display areas of the second set into a designated symbol. In one example, when a designated symbol combination is formed by the symbols displayed at the first set of symbol display areas, the gaming system modifies any instances of those same symbols displayed at the second set of symbol display areas into a Wild symbol (i.e., the designated symbol in this embodiment), and removes the symbols from the second set as described above.

It should be appreciated that the present disclosure contemplates employing the embodiments described above in association with a slot game including a single set of reels and a single set of symbol display areas rather than a multiplay slot game including a plurality of sets of reels and associated sets of symbol display areas.

It should also be appreciated that the present disclosure contemplates employing the embodiments described above in association with a community slot game played by multiple players on one or more gaming systems.

It should further be appreciated that:

(a) the quantity of reels in each set of reels;

(b) the quantity of symbol display areas in each set of symbol display areas;

(c) the symbols included in the plurality of different symbols;

(d) the specific designated symbol combinations;

(e) the winning symbol combinations included in the paytable;

(f) the award associated with each winning symbol combination;

(g) the quantity of symbol display areas with which each reel is associated;

(h) the specific symbol display areas with which each reel is associated;

(i) the specific symbol display areas with which each payline is associated;

(i) the quantity of winning symbol combinations;

(j) the quantity and definition of paylines;

(k) which symbol display areas correspond to one another;

(l) the quantity of symbol display areas with which a given symbol display area corresponds;

(m) the quantity of symbols of a formed designated symbol combination that are removed;

(n) the quantity of symbols removed from symbol display areas corresponding to the symbol display areas displaying symbols that form a designated symbol combination;

(o) the maximum quantity of times the gaming system may provide the cascading symbols feature for a single play of the multiplay slot game;

(p) the designated spatial relationship;

(q) the extent of the repositioning of any displayed symbols into one or more empty symbol display areas;

(r) the sequence of symbol removal (if any);

(s) the award definition mechanism (e.g., payline wins, scatter wins, MultiWay wins, two-way pays, any other suitable award definition mechanism, or any suitable combination thereof);

(t) how attributes are assigned to the different reel sets (e.g., reel sets may be associated with different paytables, different sets of symbols, different win mechanisms, and the like); and/or (u) any other variables or determinations described herein may be: (1) predetermined; (2) randomly determined; (3) randomly determined based on one or more weighted percentages; (4) determined based on a generated symbol or symbol combination; (5) determined independent of a generated symbol or symbol combination; (6) determined based on a random determination by a central controller (described below); (7) determined independent of a random determination by the central controller; (8) determined based on a random determination at an electronic gaming machine (EGM) configured to operate the slot game (described below); (9) determined independent of a random determination at the EGM; (10) determined based on at least one play of at least one game; (11) determined independent of at least one play of at least one game; (12) determined based on a player's selection; (13) determined independent of a player's selection; (14) determined based on one or more side wagers placed; (15) determined independent of one or more side wagers placed; (16) determined based on the player's primary game wager; (17) determined independent of the player's primary game wager; (18) determined based on time (such as the time of day); (19) determined independent of time (such as the time of day); (20) determined based on an amount of coin-in accumulated in one or more pools; (21) determined independent of an amount of coin-in accumulated in one or more pools; (22) determined based on a status of the player (i.e., a player tracking status); (23) determined independent of a status of the player (i.e., a player tracking status); (24) determined based on one or more other determinations disclosed herein; (25) determined independent of any other determination disclosed herein; and/or (26) determined in any other suitable manner or based on or independent of any other suitable factor(s).

Gaming Systems

It should be appreciated that the above-described embodiments of the present disclosure may be implemented in accordance with or in conjunction with one or more of a variety of different types of gaming systems, such as, but not limited to, those described below.

The present disclosure contemplates a variety of different gaming systems each having one or more of a plurality of different features, attributes, or characteristics. It should be appreciated that a "gaming system" as used herein refers to various configurations of: (a) one or more central servers, central controllers, or remote hosts; (b) one or more EGMs; and/or (c) one or more personal gaming devices, such as desktop computers, laptop computers, tablet computers or computing devices, personal digital assistants (PDAs), mobile telephones such as smart phones, and other mobile computing devices.

Thus, in various embodiments, the gaming system of the present disclosure includes: (a) one or more EGMs in combination with one or more central servers, central controllers, or remote hosts; (b) one or more personal gaming devices in combination with one or more central servers, central controllers, or remote hosts; (c) one or more personal gaming devices in combination with one or more EGMs; (d) one or more personal gaming devices, one or more EGMs, and one or more central servers, central controllers, or remote hosts in combination with one another; (e) a single EGM; (f) a plurality of EGMs in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity, each EGM and each personal gaming device of the present disclosure is collectively referred to herein as an "EGM." Additionally, for brevity and clarity, unless specifically stated otherwise, "EGM" as used herein represents one EGM or a plurality of EGMs, and "central server, central controller, or remote host" as used herein represents one central server, central controller, or remote host or a plurality of central servers, central controllers, or remote hosts.

Figure 3A:
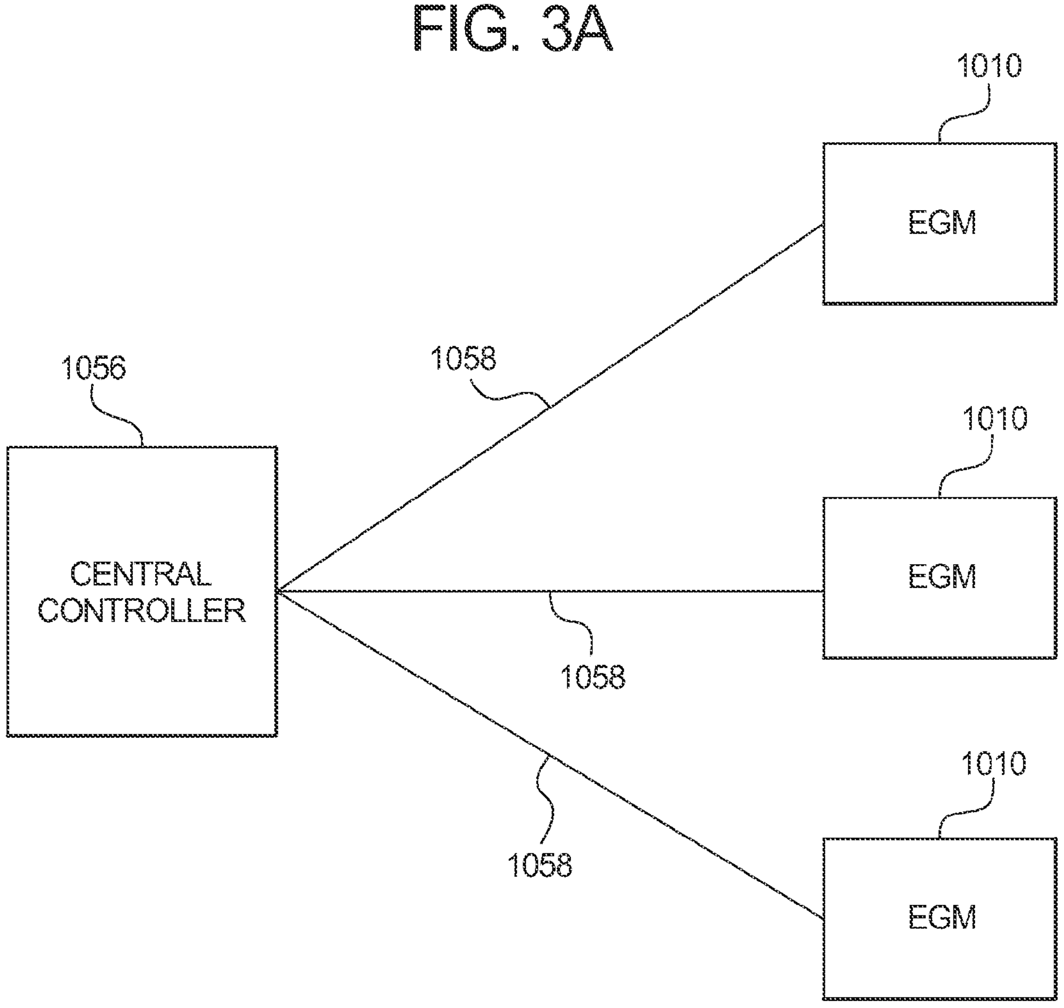
FIG. 3A is a schematic block diagram of one embodiment of a network configuration of the gaming system of the present disclosure.

As noted above, in various embodiments, the gaming system includes an EGM in combination with a central server, central controller, or remote host. In such embodiments, the EGM is configured to communicate with the central server, central controller, or remote host through a data network or remote communication link. In certain such embodiments, the EGM is configured to communicate with another EGM through the same data network or remote communication link or through a different data network or remote communication link. For example, the gaming system illustrated in FIG. 3A includes a plurality of EGMs 1010 that are each configured to communicate with a central server, central controller, or remote host 1056 through a data network 1058.

In certain embodiments in which the gaming system includes an EGM in combination with a central server, central controller, or remote host, the central server, central controller, or remote host is any suitable computing device (such as a server) that includes at least one processor and at least one memory device or storage device. As further described below, the EGM includes at least one EGM processor configured to transmit and receive data or signals representing events, messages, commands, or any other suitable information between the EGM and the central server, central controller, or remote host. The at least one processor of that EGM is configured to execute the events, messages, or commands represented by such data or signals in conjunction with the operation of the EGM. Moreover, the at least one processor of the central server, central controller, or remote host is configured to transmit and receive data or signals representing events, messages, commands, or any other suitable information between the central server, central controller, or remote host and the EGM. The at least one processor of the central server, central controller, or remote host is configured to execute the events, messages, or commands represented by such data or signals in conjunction with the operation of the central server, central controller, or remote host. It should be appreciated that one, more, or each of the functions of the central server, central controller, or remote host may be performed by the at least one processor of the EGM. It should be further appreciated that one, more, or each of the functions of the at least one processor of the EGM may be performed by the at least one processor of the central server, central controller, or remote host.

In certain such embodiments, computerized instructions for controlling any games (such as any primary or base games and/or any secondary or bonus games) displayed by the EGM are executed by the central server, central controller, or remote host. In such "thin client" embodiments, the central server, central controller, or remote host remotely controls any games (or other suitable interfaces) displayed by the EGM, and the EGM is utilized to display such games (or suitable interfaces) and to receive one or more inputs or commands. In other such embodiments, computerized instructions for controlling any games displayed by the EGM are communicated from the central server, central controller, or remote host to the EGM and are stored in at least one memory device of the EGM. In such "thick client" embodiments, the at least one processor of the EGM executes the computerized instructions to control any games (or other suitable interfaces) displayed by the EGM.

In various embodiments in which the gaming system includes a plurality of EGMs, one or more of the EGMs are thin client EGMs and one or more of the EGMs are thick client EGMs. In other embodiments in which the gaming system includes one or more EGMs, certain functions of one or more of the EGMs are implemented in a thin client environment, and certain other functions of one or more of the EGMs are implemented in a thick client environment. In one such embodiment in which the gaming system includes an EGM and a central server, central controller, or remote host, computerized instructions for controlling any primary or base games displayed by the EGM are communicated from the central server, central controller, or remote host to the EGM in a thick client configuration, and computerized instructions for controlling any secondary or bonus games or other functions displayed by the EGM are executed by the central server, central controller, or remote host in a thin client configuration.

In certain embodiments in which the gaming system includes: (a) an EGM configured to communicate with a central server, central controller, or remote host through a data network; and/or (b) a plurality of EGMs configured to communicate with one another through a data network, the data network is a local area network (LAN) in which the EGMs are located substantially proximate to one another and/or the central server, central controller, or remote host. In one example, the EGMs and the central server, central controller, or remote host are located in a gaming establishment or a portion of a gaming establishment.

In other embodiments in which the gaming system includes: (a) an EGM configured to communicate with a central server, central controller, or remote host through a data network; and/or (b) a plurality of EGMs configured to communicate with one another through a data network, the data network is a wide area network (WAN) in which one or more of the EGMs are not necessarily located substantially proximate to another one of the EGMs and/or the central server, central controller, or remote host. For example, one or more of the EGMs are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs are located. It should be appreciated that in certain embodiments in which the data network is a WAN, the gaming system includes a central server, central controller, or remote host and an EGM each located in a different gaming establishment in a same geographic area, such as a same city or a same state. It should be appreciated that gaming systems in which the data network is a WAN are substantially identical to gaming systems in which the data network is a LAN, though the quantity of EGMs in such gaming systems may vary relative to one another.

In further embodiments in which the gaming system includes: (a) an EGM configured to communicate with a central server, central controller, or remote host through a data network; and/or (b) a plurality of EGMs configured to communicate with one another through a data network, the data network is an internet or an intranet. In certain such embodiments, an internet browser of the EGM is usable to access an internet game page from any location where an internet connection is available. In one such embodiment, after the internet game page is accessed, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. It should be appreciated, however, that the central server, central controller, or remote host may identify the player in any other suitable manner, such as by validating a player tracking identification number associated with the player, by reading a player tracking card or other smart card inserted into a card reader (as described below); by validating a unique player identification number associated with the player by the central server, central controller, or remote host; or by identifying the EGM, such as by identifying the MAC address or the IP address of the internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the internet browser of the EGM.

It should be appreciated that the central server, central controller, or remote host and the EGM are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of EGMs to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

EGM Components

Figure 3B:
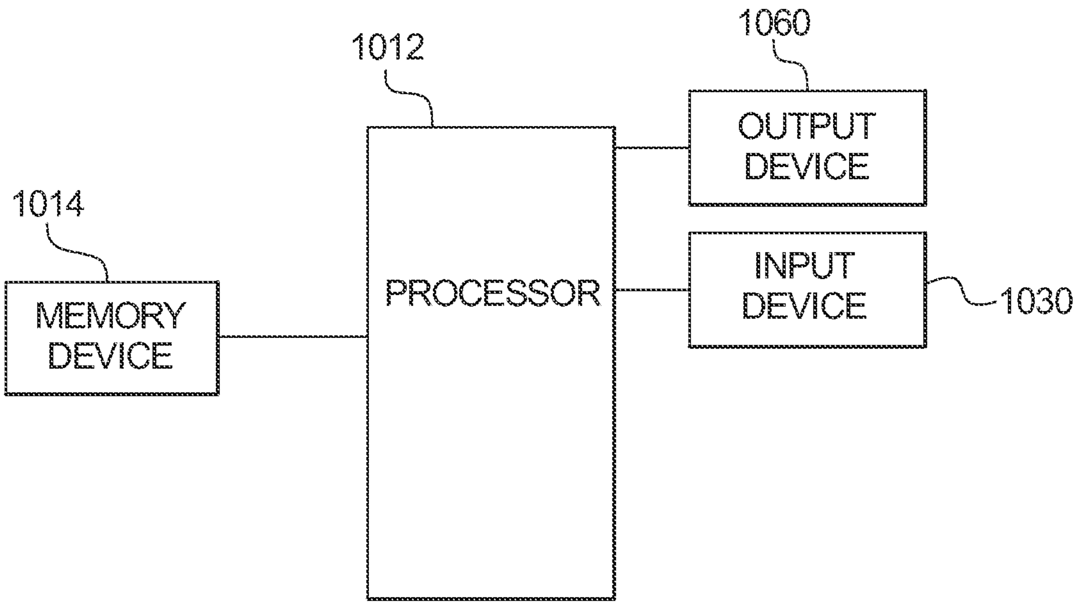
FIG. 3B is a schematic block diagram of an example electronic configuration of the gaming system of the present disclosure.

In various embodiments, an EGM includes at least one processor configured to operate with at least one memory device, at least one input device, and at least one output device. The at least one processor may be any suitable processing device or set of processing devices, such as a microprocessor, a microcontroller-based platform, a suitable integrated circuit, or one or more application-specific integrated circuits (ASICs). FIG. 3B illustrates an example EGM including a processor 1012.

As generally noted above, the at least one processor of the EGM is configured to communicate with, configured to access, and configured to exchange signals with at least one memory device or data storage device. In various embodiments, the at least one memory device of the EGM includes random access memory (RAM), which can include non-volatile RAM (NVRAM), magnetic RAM (MRAM), ferroelectric RAM (FeRAM), and other forms as commonly understood in the gaming industry. In other embodiments, the at least one memory device includes read only memory (ROM). In certain embodiments, the at least one memory device of the EGM includes flash memory and/or EEPROM (electrically erasable programmable read only memory). The example EGM illustrated in FIG. 3B includes a memory device 1014. It should be appreciated that any other suitable magnetic, optical, and/or semiconductor memory may operate in conjunction with the EGM disclosed herein. In certain embodiments, the at least one processor of the EGM and the at least one memory device of the EGM both reside within a cabinet of the EGM (as described below). In other embodiments, at least one of the at least one processor of the EGM and the at least one memory device of the EGM reside outside the cabinet of the EGM (as described below).

In certain embodiments, as generally described above, the at least one memory device of the EGM stores program code and instructions executable by the at least one processor of the EGM to control the EGM. The at least one memory device of the EGM also stores other operating data, such as image data, event data, input data, random number generators (RNGs) or pseudo-RNGs, paytable data or information, and/or applicable game rules that relate to the play of one or more games on the EGM (such as primary or base games and/or secondary or bonus games as described below). In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an internet or intranet).

Figure 4A:
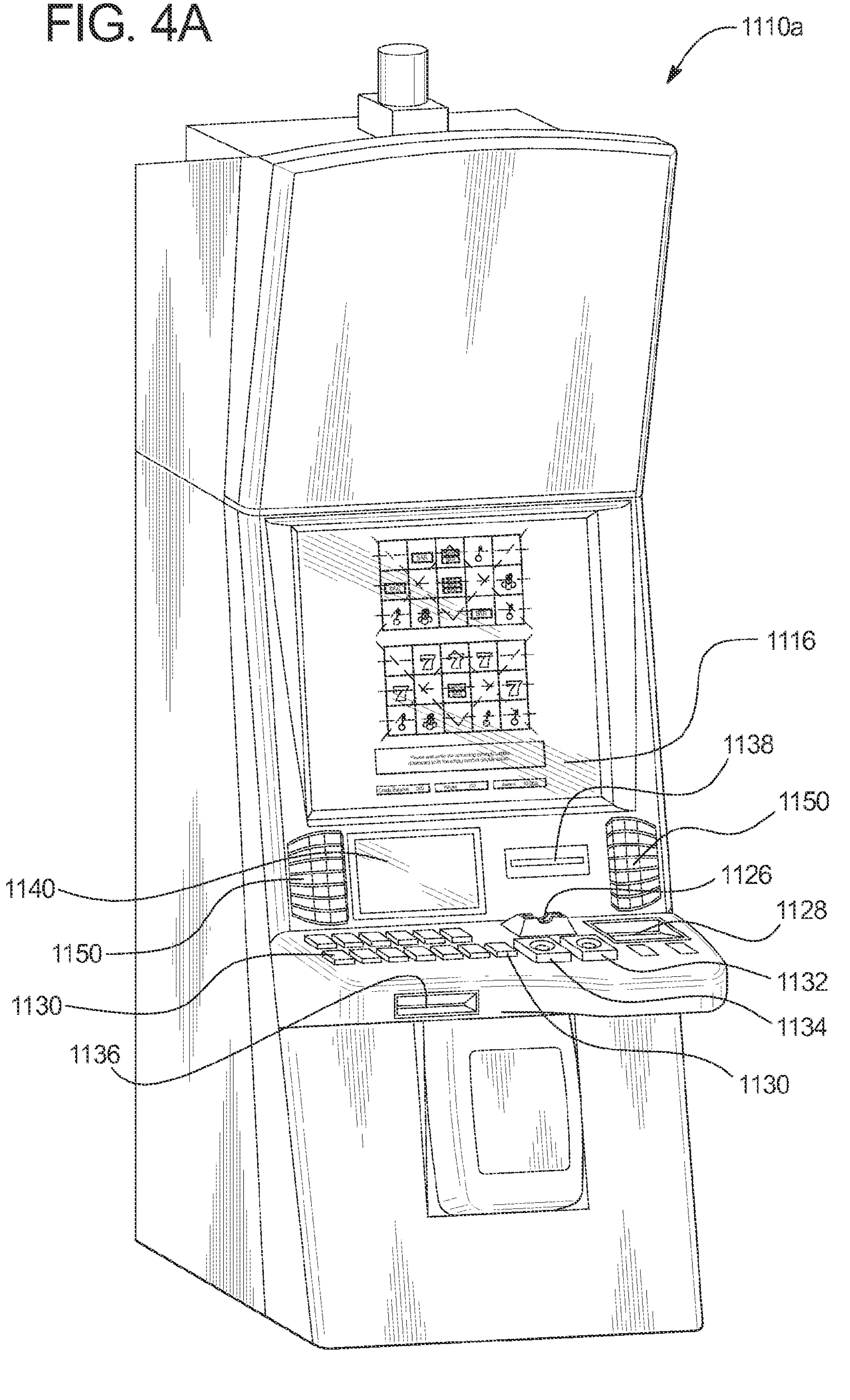
FIGS. 4A and 4B are perspective views of example alternative embodiments of the gaming system of the present disclosure.
Figure 4B:
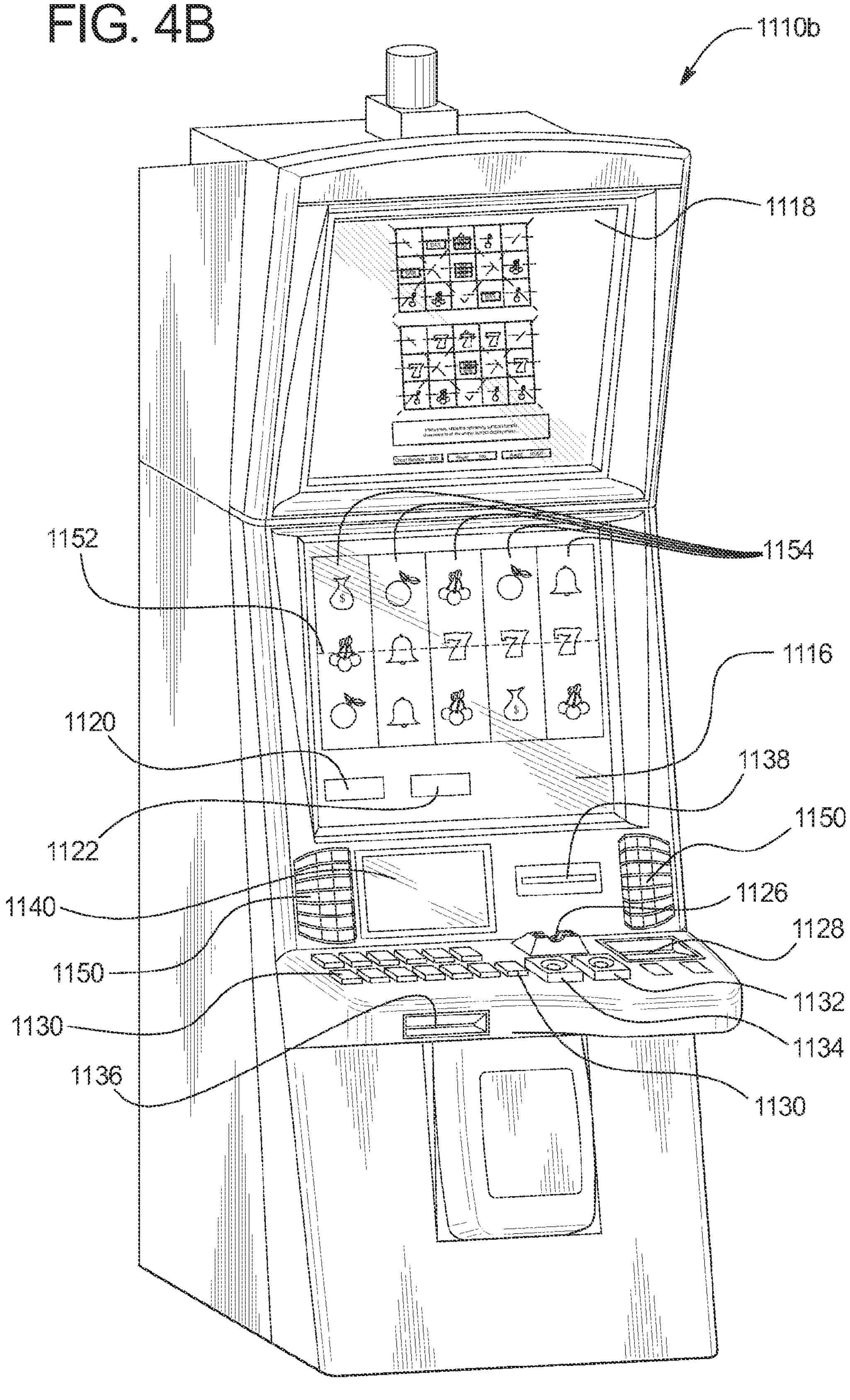

In various embodiments, the EGM includes one or more input devices. The input devices may include any suitable device that enables an input signal to be produced and received by the at least one processor of the EGM. The example EGM illustrated in FIG. 3B includes at least one input device 1030. One input device of the EGM is a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. FIGS. 4A and 4B illustrate example EGMs that each include the following payment devices: (a) a combined bill and ticket acceptor 1128, and (b) a coin slot 1126.

In one embodiment, the EGM includes a payment device configured to enable the EGM to be funded via an electronic funds transfer, such as a transfer of funds from a bank account. In another embodiment, the EGM includes a payment device configured to communicate with a mobile device of a player, such as a cell phone, a radio frequency identification tag, or any other suitable wired or wireless device, to retrieve relevant information associated with that player to fund the EGM. It should be appreciated that when the EGM is funded, the at least one processor determines the amount of funds entered and displays the corresponding amount on a credit display or any other suitable display as described below.

In various embodiments, one or more input devices of the EGM are one or more game play activation devices that are each used to initiate a play of a game on the EGM or a sequence of events associated with the EGM following appropriate funding of the EGM. The example EGMs illustrated in FIGS. 4A and 4B each include a game play activation device in the form of a game play initiation button 32. It should be appreciated that, in other embodiments, the EGM begins game play automatically upon appropriate funding rather than upon utilization of the game play activation device.

In certain embodiments, one or more input devices of the EGM are one or more wagering or betting devices. One such wagering or betting device is as a maximum wagering or betting device that, when utilized, causes a maximum wager to be placed. Another such wagering or betting device is a repeat the bet device that, when utilized, causes the previously-placed wager to be placed. A further such wagering or betting device is a bet one device. A bet is placed upon utilization of the bet one device. The bet is increased by one credit each time the bet one device is utilized. Upon the utilization of the bet one device, a quantity of credits shown in a credit display (as described below) decreases by one, and a number of credits shown in a bet display (as described below) increases by one.

In other embodiments, one input device of the EGM is a cash out device. The cash out device is utilized to receive a cash payment or any other suitable form of payment corresponding to a quantity of remaining credits of a credit display (as described below). The example EGMs illustrated in FIGS. 4A and 4B each include a cash out device in the form of a cash out button 1134.

In certain embodiments, one input device of the EGM is a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In various embodiments, one input device of the EGM is a sensor, such as a camera, in communication with the at least one processor of the EGM (and controlled by the at least one processor of the EGM in some embodiments) and configured to acquire an image or a video of a player using the EGM and/or an image or a video of an area surrounding the EGM.

In embodiments including a player tracking system, as further described below, one input device of the EGM is a card reader in communication with the at least one processor of the EGM. The example EGMs illustrated in FIGS. 4A and 4B each include a card reader 1138. The card reader is configured to read a player identification card inserted into the card reader.

In various embodiments, the EGM includes one or more output devices. The example EGM illustrated in FIG. 3B includes at least one output device 1060. One or more output devices of the EGM are one or more display devices configured to display any game(s) displayed by the EGM and any suitable information associated with such game(s). In certain embodiments, the display devices are connected to or mounted on a cabinet of the EGM (as described below). In various embodiments, the display devices serves as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM illustrated in FIG. 4A includes a central display device 1116, a player tracking display 1140, a credit display 1120, and a bet display 1122. The example EGM illustrated in FIG. 4B includes a central display device 1116, an upper display device 1118, a player tracking display 1140, a player tracking display 1140, a credit display 1120, and a bet display 1122.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. It should be appreciated that the display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, one output device of the EGM is a payout device. In these embodiments, when the cash out device is utilized as described above, the payout device causes a payout to be provided to the player. In one embodiment, the payout device is one or more of: (a) a ticket generator configured to generate and provide a ticket or credit slip representing a payout, wherein the ticket or credit slip may be redeemed via a cashier, a kiosk, or other suitable redemption system; (b) a note generator configured to provide paper currency; (c) a coin generator configured to provide coins or tokens in a coin payout tray; and (d) any suitable combination thereof. The example EGMs illustrated in FIGS. 4A and 4B each include ticket generator 1136. In one embodiment, the EGM includes a payout device configured to fund an electronically recordable identification card or smart card or a bank account via an electronic funds transfer.

In certain embodiments, one output device of the EGM is a sound generating device controlled by one or more sound cards. In one such embodiment, the sound generating device includes one or more speakers or other sound generating hardware and/or software for generating sounds, such as by playing music for any games or by playing music for other modes of the EGM, such as an attract mode. The example EGMs illustrated in FIGS. 4A and 4B each include a plurality of speakers 1150. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices. At least U.S. Patent Application Publication No. 2004/0254014 describes a variety of EGMs including one or more communication ports that enable the EGMs to communicate and operate with one or more external peripherals.

As generally described above, in certain embodiments, such as the example EGMs illustrated in FIGS. 4A and 4B, the EGM has a support structure, housing, or cabinet that provides support for a plurality of the input device and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs shown in FIGS. 4A and 4B, EGMs may have varying cabinet and display configurations.

It should be appreciated that, in certain embodiments, the EGM is a device that has obtained approval from a regulatory gaming commission, and in other embodiments, the EGM is a device that has not obtained approval from a regulatory gaming commission.

As explained above, for brevity and clarity, both the EGMs and the personal gaming devices of the present disclosure are collectively referred to herein as "EGMs." Accordingly, it should be appreciated that certain of the example EGMs described above include certain elements that may not be included in all EGMs. For example, the payment device of a personal gaming device such as a mobile telephone may not include a coin acceptor, while in certain instances the payment device of an EGM located in a gaming establishment may include a coin acceptor.

Operation of Primary or Base Games and/or Secondary or Bonus Games

In various embodiments, an EGM may be implemented in one of a variety of different configurations. In various embodiments, the EGM may be implemented as one of: (a) a dedicated EGM wherein computerized game programs executable by the EGM for controlling any primary or base games (referred to herein as "primary games") and/or any secondary or bonus games or other functions (referred to herein as "secondary games") displayed by the EGM are provided with the EGM prior to delivery to a gaming establishment or prior to being provided to a player; and (b) a changeable EGM wherein computerized game programs executable by the EGM for controlling any primary games and/or secondary games displayed by the EGM are downloadable to the EGM through a data network or remote communication link after the EGM is physically located in a gaming establishment or after the EGM is provided to a player.

As generally explained above, in various embodiments in which the gaming system includes a central server, central controller, or remote host and a changeable EGM, the at least one memory device of the central server, central controller, or remote host stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the central server, central controller, or remote host is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the central server, central controller, or remote host to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaming system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set; that is, the gaming system does not select that game outcome or award upon another game outcome and/or award request. The gaming system provides the selected game outcome and/or award. At least U.S. Pat. Nos. 7,470,183; 7,563,163; and 7,833,092 and U.S. Patent Application Publication Nos. 2005/0148382, 2006/0094509, and 2009/0181743 describe various examples of this type of award determination.

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards. At least U.S. Pat. Nos. 7,753,774; 7,731,581; 7,955,170; and 8,070,579 and U.S. Patent Application Publication No. 2011/0028201 describe various examples of this type of award determination.

In certain embodiments in which the gaming system includes a central server, central controller, or remote host and an EGM, the EGM is configured to communicate with the central server, central controller, or remote host for monitoring purposes only. In such embodiments, the EGM determines the game outcome(s) and/or award(s) to be provided in any of the manners described above, and the central server, central controller, or remote host monitors the activities and events occurring on the EGM. In one such embodiment, the gaming system includes a real-time or online accounting and gaming information system configured to communicate with the central server, central controller, or remote host. In this embodiment, the accounting and gaming information system includes: (a) a player database for storing player profiles, (b) a player tracking module for tracking players (as described below), and (c) a credit system for providing automated transactions. At least U.S. Pat. No. 6,913,534 and U.S. Patent Application Publication No. 2006/0281541 describe various examples of such accounting systems.

As noted above, in various embodiments, the gaming system includes one or more executable game programs executable by at least one processor of the gaming system to provide one or more primary games and one or more secondary games. The primary game(s) and the secondary game(s) may comprise any suitable games and/or wagering games, such as, but not limited to: electro-mechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the gaming system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the gaming system. In certain such embodiments, the gaming system includes one or more paylines associated with the reels. The example EGMs shown in FIGS. 4A and 4B each include a payline 1152 and a plurality of reels 1154. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display areas on a requisite number of adjacent reels. In one such embodiment, one or more paylines are formed between at least two symbol display areas that are adjacent to each other by either sharing a common side or sharing a common corner (i.e., such paylines are connected paylines). The gaming system enables a wager to be placed on one or more of such paylines to activate such paylines. In other embodiments in which one or more paylines are formed between at least two adjacent symbol display areas, the gaming system enables a wager to be placed on a plurality of symbol display areas, which activates those symbol display areas.

In various embodiments, the gaming system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the gaming system employs a ways to win award determination. In these embodiments, any outcome to be provided is determined based on a number of associated symbols that are generated in active symbol display areas on the requisite number of adjacent reels (i.e., not on paylines passing through any displayed winning symbol combinations). If a winning symbol combination is generated on the reels, one award for that occurrence of the generated winning symbol combination is provided. At least U.S. Pat. No. 8,012,011 and U.S. Patent Application Publication Nos. 2008/0108408 and 2008/0132320 describe various examples of ways to win award determinations.

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award. At least U.S. Pat. Nos. 5,766,079; 7,585,223; 7,651,392; 7,666,093; 7,780,523; and 7,905,778 and U.S. Patent Application Publication Nos. 2008/0020846, 2009/0123364, 2009/0123363, and 2010/0227677 describe various examples of different progressive gaming systems.

As generally noted above, in addition to providing winning credits or other awards for one or more plays of the primary game(s), in various embodiments the gaming system provides credits or other awards for one or more plays of one or more secondary games. The secondary game typically enables a prize or payout in to be obtained addition to any prize or payout obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game(s). It should be appreciated that the secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. It should be appreciated that any suitable triggering event or qualifying condition or any suitable combination of a plurality of different triggering events or qualifying conditions may be employed.

In other embodiments, at least one processor of the gaming system randomly determines when to provide one or more plays of one or more secondary games. In one such embodiment, no apparent reason is provided for the providing of the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards. At least U.S. Patent Application Publication Nos. 2007/0123341, 2008/0070680, 2008/0176650, and 2009/0124363 describe various examples of different group gaming systems.

In various embodiments, the gaming system includes one or more player tracking systems. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming system to begin a gaming session, the card reader reads the player identification number off the player tracking card to identify the player. The gaming system timely tracks any suitable information or data relating to the identified player's gaming session. The gaming system also timely tracks when the player tracking card is removed to conclude play for that gaming session. In another embodiment, rather than requiring insertion of a player tracking card into the card reader, the gaming system utilizes one or more portable devices, such as a cell phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device. At least U.S. Pat. Nos. 6,722,985; 6,908,387; 7,311,605; 7,611,411; 7,617,151; and 8,057,298 describe various examples of player tracking systems.

It should be understood that various changes and modifications to the present embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming system comprising:

at least one input device;

at least one display device;

at least one processor; and at least one memory device storing a plurality of instructions which, when executed by the at least one processor, cause the at least one processor to operate with the at least one input device and the at least one display device to:

(a) display a first set of a plurality of symbol display areas;

(b) display a second different set of a plurality of symbol display areas, wherein for each of the symbol display areas of the first set, said symbol display area corresponds to one of the symbol display areas of the second set;

(c) for each of the symbol display areas, display one of a plurality of different symbols at said symbol display area; and (d) if one or more of a plurality of different designated symbol combinations are formed by the symbols displayed at the symbol display areas of the first set:

(i) for each of at least one of said one or more formed designated symbol combinations, for each of at least one of the symbols of said formed designated symbol combination, remove the symbol displayed at the symbol display area of the second set that corresponds to the symbol display area of the first set at which said symbol of the formed designated symbol combination is displayed to create an empty symbol display area; and (ii) thereafter, for each empty symbol display area, generate and display one of the symbols at said empty symbol display area.

2. The gaming system of claim 1, wherein the designated symbol combinations include at least one winning symbol combination.

3. The gaming system of claim 1, wherein the plurality of instructions, when executed by the at least one processor, cause the at least one processor to operate with the at least one display device to:

(a) determine if any of a plurality of different winning symbol combinations are formed by the symbols displayed at the symbol display areas of the first set;

(b) determine if any of the winning symbol combinations are formed by the symbols displayed at the symbol display areas of the second set; and (c) display any awards associated with any formed winning symbol combinations.

4. The gaming system of claim 1, wherein the plurality of instructions, when executed by the at least one processor, cause the at least one processor to operate with the at least one display device to, after removing any displayed symbols, if one of the displayed symbols has a designated spatial relationship with one or more empty symbol display areas, reposition said displayed symbol to one of said one or more empty symbol display areas.

5. The gaming system of claim 1, wherein the plurality of instructions, when executed by the at least one processor, cause the at least one processor to repeat (d) after, for each empty symbol display area, generating and displaying one of the symbols at said empty symbol display area.

6. The gaming system of claim 1, wherein the plurality of instructions, when executed by the at least one processor, cause the at least one processor to operate with the at least one display device to, if one or more of the designated symbol combinations are formed by the symbols displayed at the symbol display areas of the first set, for each of at least one of said one or more formed designated symbol combinations, for each of at least one of the symbols of said formed designated symbol combination:

(a) remove the symbol displayed at the symbol display area of the second set that corresponds to the symbol display area of the first set at which said symbol of the formed designated symbol combination is displayed to create an empty symbol display area if said symbol of the formed designated symbol combination is not a designated symbol; and (b) not remove the symbol displayed at the symbol display area of the second set that corresponds to the symbol display area of the first set at which said symbol of the formed designated symbol combination is displayed to create an empty symbol display area if said symbol of the formed designated symbol combination is a designated symbol.

7. The gaming system of claim 6, wherein the designated symbol is at least one of: a wild symbol, a bonus trigger symbol, and a scatter pay symbol.

8. A method of operating a gaming system, said method comprising:

(a) causing at least one processor to execute a plurality of instructions stored in at least one memory device to operate with at least one display device to display a first set of a plurality of symbol display areas;

(b) causing the at least one processor to execute the plurality of instructions to operate with the at least one display device to display a second different set of a plurality of symbol display areas, wherein for each of the symbol display areas of the first set, said symbol display area corresponds to one of the symbol display areas of the second set;

(c) for each of the symbol display areas, causing the at least one processor to execute the plurality of instructions to operate with the at least one display device to display one of a plurality of different symbols at said symbol display area; and (d) if one or more of a plurality of different designated symbol combinations are formed by the symbols displayed at the symbol display areas of the first set, causing the at least one processor to execute the plurality of instructions to:

(i) for each of at least one of said one or more formed designated symbol combinations, for each of at least one of the symbols of said formed designated symbol combination, operate with the at least one display device to remove the symbol displayed at the symbol display area of the second set that corresponds to the symbol display area of the first set at which said symbol of the formed designated symbol combination is displayed to create an empty symbol display area; and (ii) thereafter, for each empty symbol display area, generate and operate with the at least one display device to display one of the symbols at said empty symbol display area.

9. The method of claim 8, wherein the designated symbol combinations include at least one winning symbol combination.

10. The method of claim 8, which includes causing the at least one processor to execute the plurality of instructions to:

(a) determine if any of a plurality of different winning symbol combinations are formed by the symbols displayed at the symbol display areas of the first set;

(b) determine if any of the winning symbol combinations are formed by the symbols displayed at the symbol display areas of the second set; and (c) operate with the at least one display device to display any awards associated with any formed winning symbol combinations.

11. The method of claim 8, which includes causing the at least one processor to execute the plurality of instructions to operate with the at least one display device to, after removing any displayed symbols, if one of the displayed symbols has a designated spatial relationship with one or more empty symbol display areas, reposition said displayed symbol to one of said one or more empty symbol display areas.

12. The method of claim 8, which includes repeating (d) after, for each empty symbol display area, generating and displaying one of the symbols at said empty symbol display area.

13. The method of claim 8, which includes causing the at least one processor to execute the plurality of instructions to operate with the at least one display device to, if one or more of the designated symbol combinations are formed by the symbols displayed at the symbol display areas of the first set, for each of at least one of said one or more formed designated symbol combinations, for each of at least one of the symbols of said formed designated symbol combination:

(a) remove the symbol displayed at the symbol display area of the second set that corresponds to the symbol display area of the first set at which said symbol of the formed designated symbol combination is displayed to create an empty symbol display area if said symbol of the formed designated symbol combination is not a designated symbol; and (b) not remove the symbol displayed at the symbol display area of the second set that corresponds to the symbol display area of the first set at which said symbol of the formed designated symbol combination is displayed to create an empty symbol display area if said symbol of the formed designated symbol combination is a designated symbol.

14. The method of claim 13, wherein the designated symbol is at least one of: a wild symbol, a bonus trigger symbol, and a scatter pay symbol.

15. The method of claim 8, which is provided through a data network.

16. The method of claim 15, wherein the data network is an internet.

17. A gaming system comprising:

at least one input device;

at least one display device;

at least one processor; and at least one memory device storing a plurality of instructions which, when executed by the at least one processor, cause the at least one processor to operate with the at least one input device and the at least one display device to:

(a) display a first set of a plurality of symbol display areas;

(b) display a second different set of a plurality of symbol display areas;

(c) for each of the symbol display areas, display one of a plurality of different symbols at said symbol display area; and (d) if one or more of a plurality of different designated symbol combinations are formed by the symbols displayed at the symbol display areas of the first set:

(i) for each of at least one of said one or more formed designated symbol combinations, for each of at least one of the symbols of said formed designated symbol combination, remove each instance of said symbol displayed at any of the symbol display areas of the second set to create at least one empty symbol display area;

(ii) thereafter, for each of any displayed symbols having a designated spatial relationship with one or more empty symbol display areas, reposition said displayed symbol to one of said one or more empty symbol display areas; and (iii) thereafter, for each empty symbol display area, generate and display one of the symbols at said empty symbol display area.

18. The gaming system of claim 17, wherein the designated symbol combinations include at least one winning symbol combination.

19. The gaming system of claim 17, wherein the plurality of instructions, when executed by the at least one processor, cause the at least one processor to operate with the at least one display device to:
(a) determine if any of a plurality of different winning symbol combinations are formed by the symbols displayed at the symbol display areas of the first set;
(b) determine if any of the winning symbol combinations are formed by the symbols displayed at the symbol display areas of the second set; and
(c) display any awards associated with any formed winning symbol combinations.

20. The gaming system of claim 18, wherein the plurality of instructions, when executed by the at least one processor, cause the at least one processor to repeat (d) after, for each empty symbol display area, generating and displaying one of the symbols at said empty symbol display area.

21. A method of operating a gaming system, said method comprising:
(a) causing at least one processor to execute a plurality of instructions stored in at least one memory device to operate with at least one display device to display a first set of a plurality of symbol display areas;
(b) causing the at least one processor to execute the plurality of instructions to operate with the at least one display device to display a second different set of a plurality of symbol display areas;
(c) for each of the symbol display areas, causing the at least one processor to execute the plurality of instructions to operate with the at least one display device to display one of a plurality of different symbols at said symbol display area; and
(d) if one or more of a plurality of different designated symbol combinations are formed by the symbols displayed at the symbol display areas of the first set, causing the at least one processor to execute the plurality of instructions to:
(i) for each of at least one of said one or more formed designated symbol combinations, for each of at least one of the symbols of said formed designated symbol combination, operate with the at least one display device to remove each instance of said symbol displayed at any of the symbol display areas of the second set to create at least one empty symbol display area;
(ii) thereafter, for each of any displayed symbols having a designated spatial relationship with one or more empty symbol display areas, operate with the at least one display device to reposition said displayed symbol to one of said one or more empty symbol display areas; and
(iii) thereafter, for each empty symbol display area, generate and operate with the at least one display device to display one of the symbols at said empty symbol display area.

22. The method of claim 21, wherein the designated symbol combinations include at least one winning symbol combination.

23. The method of claim 21, which includes causing the eat least one processor to execute the plurality of instructions to:
(a) determine if any of a plurality of different winning symbol combinations are formed by the symbols displayed at the symbol display areas of the first set;
(b) determine if any of the winning symbol combinations are formed by the symbols displayed at the symbol display areas of the second set; and
(c) operate with the at least one display device to display any awards associated with any formed winning symbol combinations.

24. The method of claim 21, which includes repeating (d) after, for each empty symbol display area, generating and displaying one of the symbols at said empty symbol display area.

25. The method of claim 21, which is provided through a data network.

26. The method of claim 25, wherein the data network is an internet.

27. A gaming system comprising:
at least one input device;
at least one display device;
at least one processor; and
at least one memory device storing a plurality of instructions which, when executed by the at least one processor, cause the at least one processor to operate with the at least one input device and the at least one display device to:
(a) display a first set of a plurality of symbol display areas;
(b) display a second different set of a plurality of symbol display areas;
(c) for each of the symbol display areas, display one of a plurality of different symbols at said symbol display area; and
(d) if one or more of a plurality of different designated symbol combinations are formed by the symbols displayed at the symbol display areas of the first set:
(i) for each of said one or more formed designated symbol combinations:
(A) determine a pattern formed by the symbol display areas displaying the symbols of said formed designated symbol combination,
(B) determine one or more symbol display areas of the second set that correspond to a mirror image of said pattern, and
(C) remove the symbol displayed each symbol display area of the second set that corresponds to the mirror image of said pattern;
(ii) thereafter, for each of any displayed symbols having a designated spatial relationship with one or more empty symbol display areas, reposition said displayed symbol to one of said one or more empty symbol display areas; and
(iii) thereafter, for each empty symbol display area, generate and display one of the symbols at said empty symbol display area.

28. The gaming system of claim 27, wherein the designated symbol combinations include at least one winning symbol combination.

29. The gaming system of claim 27, wherein the plurality of instructions, when executed by the at least one processor, cause the at least one processor to operate with the at least one display device to:
(a) determine if any of a plurality of different winning symbol combinations are formed by the symbols displayed at the symbol display areas of the first set;
(b) determine if any of the winning symbol combinations are formed by the symbols displayed at the symbol display areas of the second set; and
(c) display any awards associated with any formed winning symbol combinations.

30. The gaming system of claim 27, wherein the plurality of instructions, when executed by the at least one processor, cause the at least one processor to repeat (d) after, for each empty symbol display area, generating and displaying one of the symbols at said empty symbol display area.

31. A method of operating a gaming system, said method comprising:

(a) causing at least one processor to execute a plurality of instructions stored in at least one memory device to operate with at least one display device to display a first set of a plurality of symbol display areas;

(b) causing the at least one processor to execute the plurality of instructions to operate with the at least one display device to display a second different set of a plurality of symbol display areas;

(c) for each of the symbol display areas, causing the at least one processor to execute the plurality of instructions to operate with the at least one display device to display one of a plurality of different symbols at said symbol display area; and (d) if one or more of a plurality of different designated symbol combinations are formed by the symbols displayed at the symbol display areas of the first set:

(i) for each of said one or more formed designated symbol combinations, causing the at least one processor to execute the plurality of instructions to:

(A) determine a pattern formed by the symbol display areas displaying the symbols of said formed designated symbol combination, (B) determine one or more symbol display areas of the second set that correspond to a mirror image of said pattern, and (C) operate with the at least one display device to remove the symbol displayed each symbol display area of the second set that corresponds to the mirror image of said pattern;

(ii) thereafter, for each of any displayed symbols having a designated spatial relationship with one or more empty symbol display areas, causing the at least one processor to execute the plurality of instructions to operate with the at least one display device to reposition said displayed symbol to one of said one or more empty symbol display areas; and (iii) thereafter, for each empty symbol display area, generate and causing the at least one processor to execute the plurality of instructions to operate with the at least one display device to display one of the symbols at said empty symbol display area.

32. The method of claim 31, wherein the designated symbol combinations include at least one winning symbol combination.

33. The method of claim 31, which includes causing the at least one processor to execute the plurality of instructions to:

(a) determine if any of a plurality of different winning symbol combinations are formed by the symbols displayed at the symbol display areas of the first set;

(b) determine if any of the winning symbol combinations are formed by the symbols displayed at the symbol display areas of the second set; and (c) operate with the at least one display device to display any awards associated with any formed winning symbol combinations.

34. The method of claim 31, which includes repeating (d) after, for each empty symbol display area, generating and displaying one of the symbols at said empty symbol display area.

35. The method of claim 31, which is provided through a data network.

36. The method of claim 35, wherein the data network is an internet.

* * * * *